United States Patent
Cashmore et al.

(10) Patent No.: US 9,907,336 B2
(45) Date of Patent: Mar. 6, 2018

(54) POROUS CARBON MATERIALS AND SMOKING ARTICLES AND SMOKE FILTERS THEREFOR INCORPORATING SUCH MATERIALS

(75) Inventors: Maria Cashmore, Southampton (GB); Peter Rex White, Southampton (GB); Oleksandr Kozynchenko, Plymouth (GB); Andrew Blackburn, Plymouth (GB); Stephen Robert Tennison, Plymouth (GB)

(73) Assignee: BRITISH AMERICAN TOBACCO (INVESTMENTS) LIMITED, London (GB)

(*) Notice: Subject to any disclaimer, the term of this patent is extended or adjusted under 35 U.S.C. 154(b) by 1207 days.

(21) Appl. No.: 11/887,301

(22) PCT Filed: Mar. 27, 2006

(86) PCT No.: PCT/GB2006/001102
§ 371 (c)(1),
(2), (4) Date: Nov. 7, 2007

(87) PCT Pub. No.: WO2006/103404
PCT Pub. Date: Oct. 5, 2006

(65) Prior Publication Data
US 2009/0038632 A1    Feb. 12, 2009

(30) Foreign Application Priority Data
Mar. 29, 2005    (GB) .................................. 0506278.1

(51) Int. Cl.
*A24B 15/28*    (2006.01)
*A24D 3/16*    (2006.01)
(Continued)

(52) U.S. Cl.
CPC .............. *A24D 3/163* (2013.01); *B01J 20/20* (2013.01); *B01J 20/2808* (2013.01);
(Continued)

(58) Field of Classification Search
None
See application file for complete search history.

(56) References Cited

U.S. PATENT DOCUMENTS

| 1,505,517 | A | 8/1924 | Woodruff et al. |
| 1,758,202 | A | 5/1930 | Rice |

(Continued)

FOREIGN PATENT DOCUMENTS

| CN | 2067483 U | 12/1990 |
| CN | 1247212 | 3/2000 |

(Continued)

OTHER PUBLICATIONS

Patent Cooperation Treaty—Notification Concerning Transmittal of International Preliminary Report on Patentability; dated Oct. 19, 2007.
(Continued)

*Primary Examiner* — Michael H Wilson
*Assistant Examiner* — Phu Nguyen
(74) *Attorney, Agent, or Firm* — Cantor Colburn LLP

(57) ABSTRACT

A porous carbon material suitable for incorporation in smoke filters for cigarettes has a BET surface area of at least 800 $m^2/g$ and a pore structure that includes mesopores and micropores. The pore volume (as measured by nitrogen adsorption) is at least 0.9 $cm^3/g$ and from 15 to 65% of the pore volume is in mesopores. The pore structure of the material provides a bulk density generally less than 0.5 g/cc. The material may be produced by carbonizing and activating organic resins and may be in the form of beads for ease of handling.

39 Claims, 17 Drawing Sheets

Figure 1:
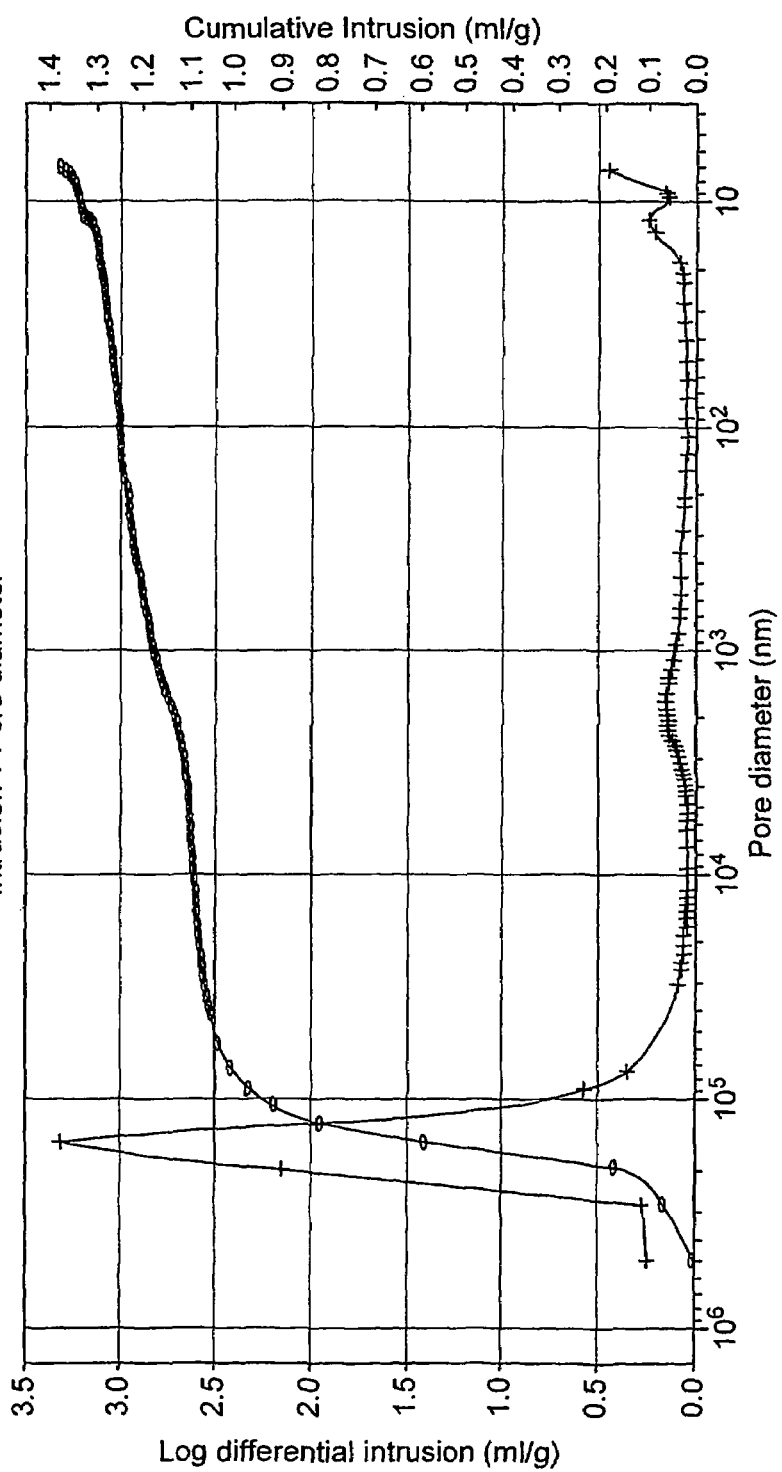

Example A - Porosimetry (Hg)
Intrusion v Pore diameter

(51) Int. Cl.
  *B01J 20/20* (2006.01)
  *B01J 20/28* (2006.01)
  *C04B 38/00* (2006.01)
  *C04B 38/06* (2006.01)
  *C01B 32/30* (2017.01)

(52) U.S. Cl.
  CPC ... *B01J 20/28011* (2013.01); *B01J 20/28057* (2013.01); *B01J 20/28069* (2013.01); *B01J 20/28073* (2013.01); *B01J 20/28076* (2013.01); *B01J 20/28083* (2013.01); *B01J 20/28092* (2013.01); *C01B 32/30* (2017.08); *C04B 38/009* (2013.01); *C04B 38/0615* (2013.01); *C01P 2004/51* (2013.01); *C01P 2004/61* (2013.01); *C01P 2006/10* (2013.01); *C01P 2006/12* (2013.01); *C01P 2006/14* (2013.01); *C01P 2006/16* (2013.01); *C01P 2006/17* (2013.01)

(56) References Cited

U.S. PATENT DOCUMENTS

| | | | |
|---|---|---|---|
| 2,286,654 A | 6/1942 | Simpson et al. | |
| 3,251,365 A * | 5/1966 | Keith, II et al. | 131/344 |
| 3,347,247 A | 10/1967 | Lloyd | |
| 3,351,071 A | 11/1967 | Belfort | |
| 3,368,566 A | 2/1968 | Avedikian | |
| 3,409,020 A | 11/1968 | Westbrook, Jr. et al. | |
| 3,557,801 A | 1/1971 | Jamison | |
| 3,608,564 A * | 9/1971 | Takahashi et al. | 131/342 |
| 3,901,823 A | 8/1975 | Dimitri et al. | |
| 3,909,449 A | 9/1975 | Nagai et al. | |
| 4,015,610 A | 4/1977 | Pasche | |
| 4,029,600 A | 6/1977 | Schmitt, Jr. et al. | |
| 4,040,990 A | 8/1977 | Neely | |
| 4,045,368 A | 8/1977 | Katori et al. | |
| 4,242,226 A | 12/1980 | Siren | |
| 4,265,768 A | 5/1981 | Beasley et al. | |
| 4,281,671 A | 8/1981 | Bynre et al. | |
| 4,343,320 A | 8/1982 | Muto | |
| 4,407,976 A | 10/1983 | Merz et al. | |
| 4,420,443 A | 12/1983 | Kaji et al. | |
| 4,424,318 A | 1/1984 | Vairetti et al. | |
| 4,579,718 A | 4/1986 | Vairetti et al. | |
| 4,917,835 A | 4/1990 | Lear et al. | |
| 4,957,897 A | 9/1990 | Maroldo et al. | |
| 5,129,408 A | 7/1992 | Jakob et al. | |
| 5,212,131 A | 5/1993 | Belding | |
| 5,404,890 A | 4/1995 | Gentry et al. | |
| 5,456,868 A | 10/1995 | Lear et al. | |
| 5,568,819 A | 10/1996 | Gentry et al. | |
| 5,896,861 A | 4/1999 | Veluz | |
| 6,033,506 A | 3/2000 | Klett | |
| 6,064,560 A | 5/2000 | Hirahara et al. | |
| 6,119,701 A | 9/2000 | Cerami et al. | |
| 6,257,242 B1 | 7/2001 | Stavridis | |
| 6,286,516 B1 | 9/2001 | Bowen et al. | |
| 6,309,446 B1 | 10/2001 | Nakanoya et al. | |
| 6,316,378 B1 | 11/2001 | Giebelhausen et al. | |
| 6,492,471 B1 | 12/2002 | Eisenbeiss et al. | |
| 6,615,842 B1 | 9/2003 | Cerami et al. | |
| 6,615,843 B2 | 9/2003 | Pera | |
| 6,746,760 B2 | 6/2004 | Minemura | |
| 6,814,786 B1 | 11/2004 | Zhuang et al. | |
| 6,865,068 B1 * | 3/2005 | Murakami et al. | 361/502 |
| 7,370,657 B2 | 5/2008 | Zhuang | |
| 7,538,069 B2 | 5/2009 | Schonfeld et al. | |
| 7,552,735 B2 | 6/2009 | Xue | |
| 7,662,747 B2 | 2/2010 | De Ruiter | |
| 7,767,134 B2 | 8/2010 | Xue | |
| 7,784,470 B2 | 8/2010 | Paine | |
| 7,784,471 B2 | 8/2010 | Paine | |
| 2003/0159703 A1 | 8/2003 | Yang et al. | |
| 2004/0016436 A1 | 1/2004 | Thomas | |
| 2004/0024074 A1 * | 2/2004 | Tennison et al. | 521/99 |
| 2004/0129280 A1 | 7/2004 | Woodson et al. | |
| 2004/0226569 A1 | 11/2004 | Yang et al. | |
| 2006/0201524 A1 | 9/2006 | Zhang et al. | |
| 2007/0000507 A1 | 1/2007 | Xue et al. | |
| 2007/0258879 A1 | 11/2007 | Karles et al. | |
| 2007/0261706 A1 | 11/2007 | Banerjea et al. | |
| 2009/0038632 A1 | 2/2009 | Cashmore et al. | |
| 2010/0028245 A1 | 2/2010 | De Ruiter | |
| 2010/0152040 A1 | 6/2010 | Karles et al. | |

FOREIGN PATENT DOCUMENTS

| | | |
|---|---|---|
| EP | 0051210 | 5/1982 |
| EP | 1049116 A1 | 11/2000 |
| EP | 1134023 | 9/2001 |
| EP | 1474008 | 10/2004 |
| GB | 228954 | 2/1925 |
| GB | 1383085 | 2/1975 |
| GB | 1479048 | 7/1977 |
| GB | 2280898 | 2/1995 |
| GB | 2395650 A | 6/2004 |
| JP | 6027375 | 2/1985 |
| JP | 61068135 | 4/1986 |
| JP | 63237770 | 10/1988 |
| JP | 63237771 | 10/1988 |
| JP | 63237772 | 10/1988 |
| JP | 63248380 | 10/1988 |
| JP | 3091795 | 9/1991 |
| JP | 6105675 | 4/1994 |
| WO | 2000005172 | 2/2000 |
| WO | 2001019904 | 3/2001 |
| WO | 2002012380 | 2/2002 |
| WO | 2003033135 | 4/2003 |
| WO | 03059096 A1 | 7/2003 |
| WO | 2005032287 | 4/2005 |
| WO | 2005115182 | 12/2005 |

OTHER PUBLICATIONS

Zalc J M et al Mixing Dynamics in the SMX Static mixer; vol. 43, No. 4; Apr. 2003; pp. 875-890; Rutger University; USA
Bratek et al. "Carbon adsorbents from waste ion-exchange resin" Carbon, vol. 40, No. 12, 2002, pp. 2213-2220; Elsevier Science Ltd.
G.F. Liptrot et al.; "Modern Physical Chemistty"; 4th Edition; 1986; pp. 154-168; Publisher Bell & London Hyman; London.
"Carbon Action"; Tobacco Reporter magazine; pp. 38-42.
D10—"Ambersorb Carbonaceous Adsorbents"; 1992; Publisher Roham and Haas; 2007.
R.C. Bansal et al; "Active Carbon"; 1991; pp. 23-24; Publisher Marcel Dekker Inc,; New York.
"Filters as Flavour Carriers", Tobacco Industry; 1994; pp. 134-136; Publisher Millenium Press Ltd.
"What's Happening to Charcoal Filters?"; Tobacco Reporter; Mar. 1968; pp. 24-31.
H Jankowska et al; "Active Carbon"; publisher Ellis Horwood; pp. 29-31and pp. 80-81 (1991); London.
J.W. Hassler; "Activated Carbon", 1967; pp. 89-94; Publisher Leonard Hill; London.
Filtrona—Advertisement; "Flavour your cigarettes not your machines", Tobacco Reporter Magazine Feb. 17, 1999, p. 9.

\* cited by examiner

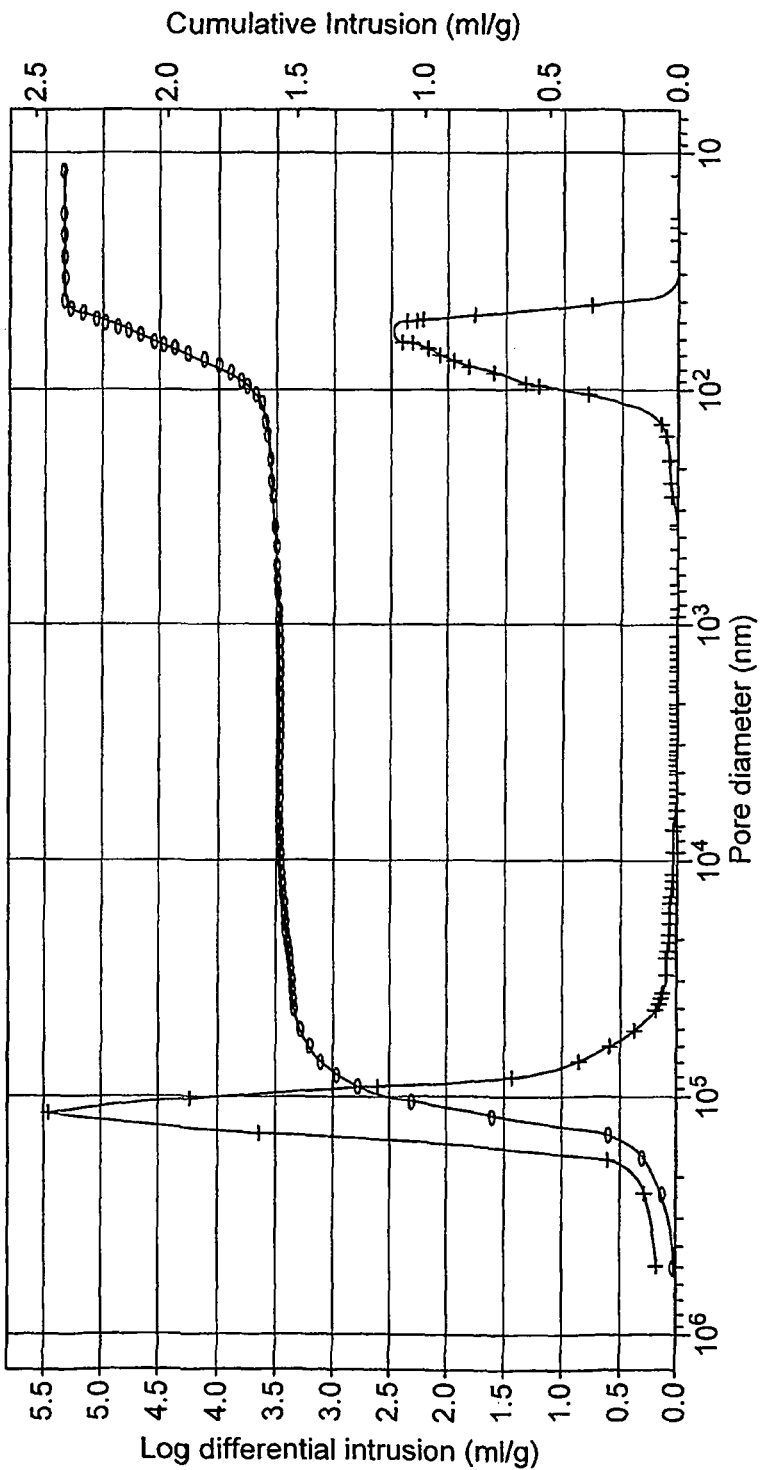

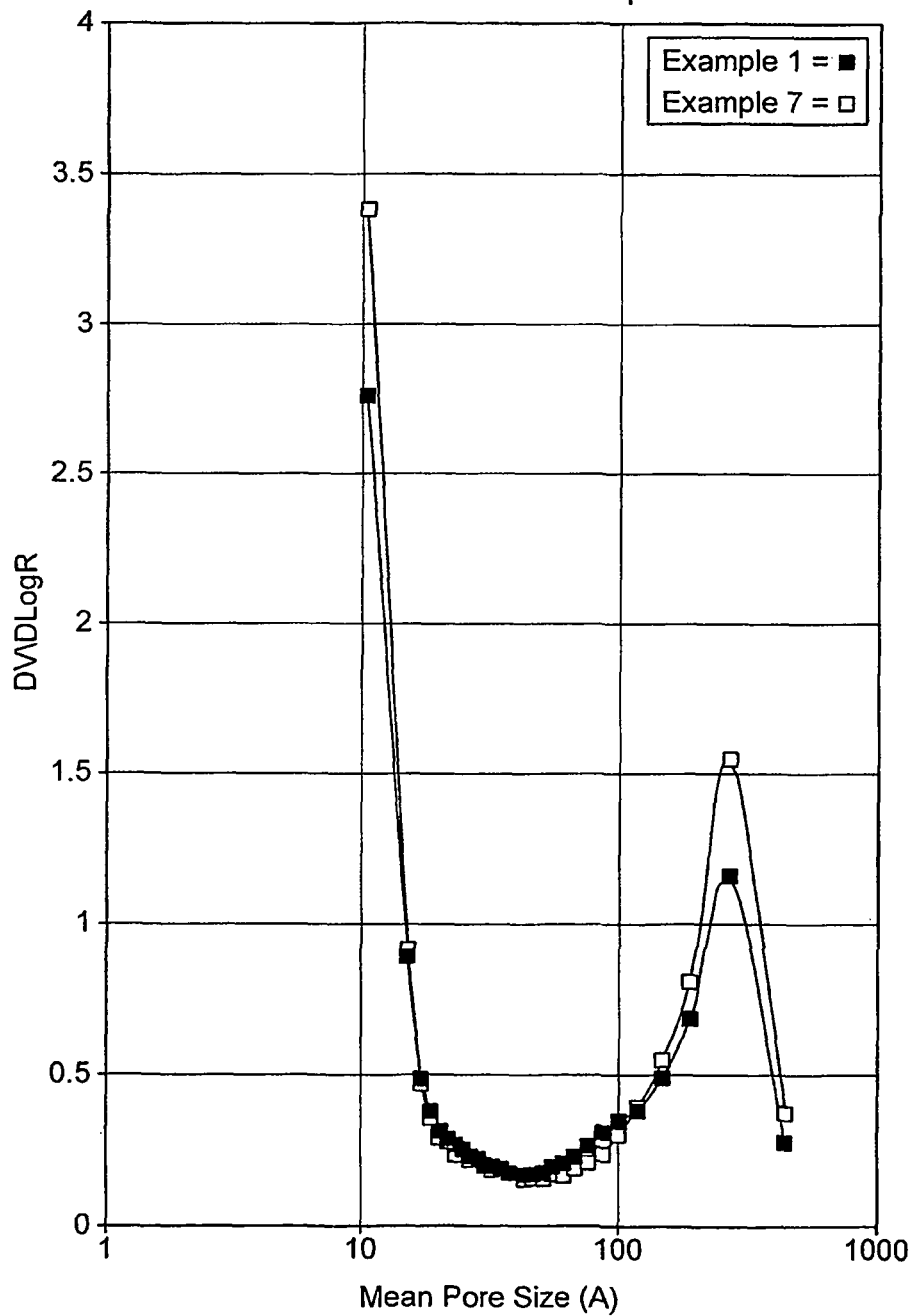

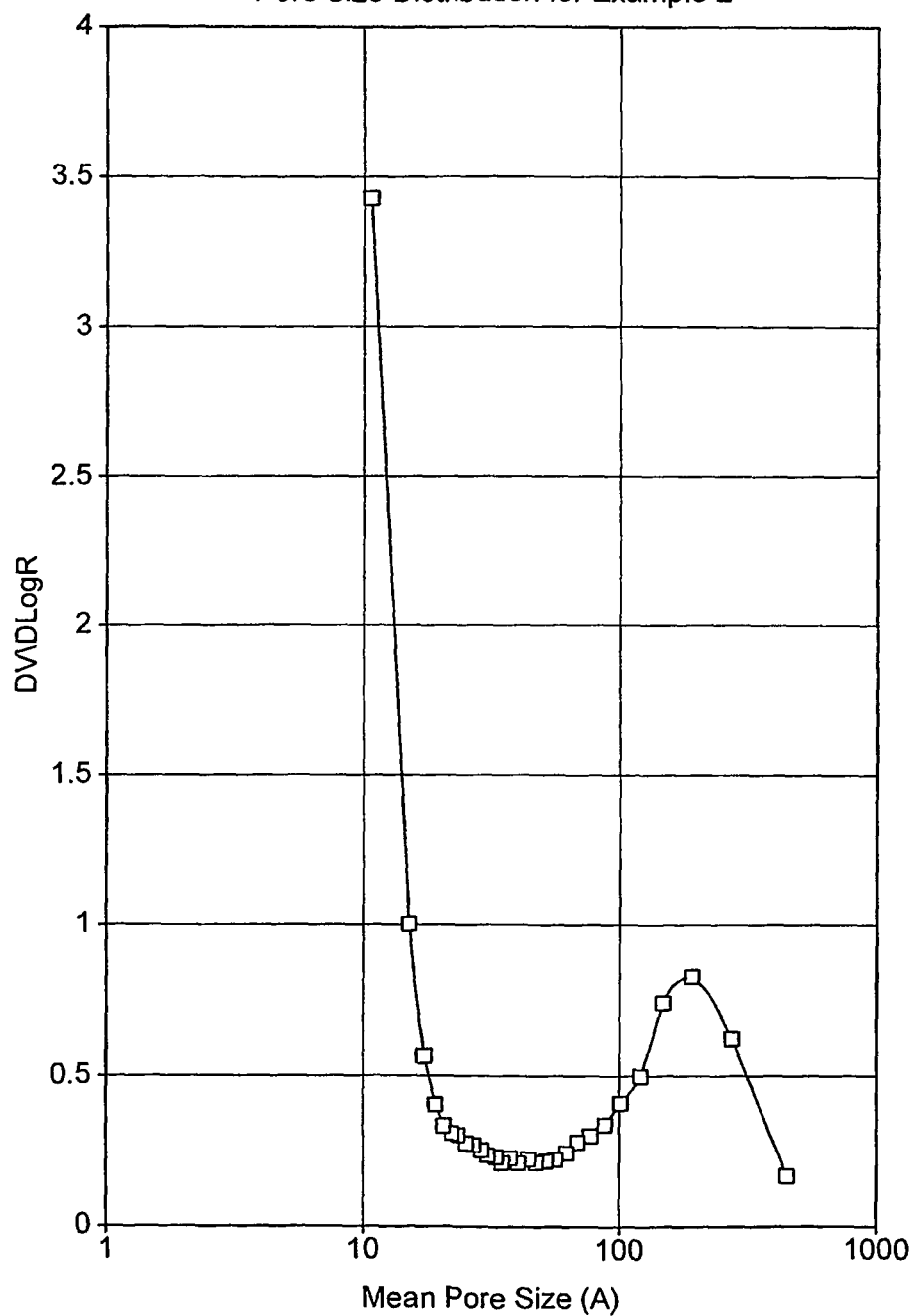

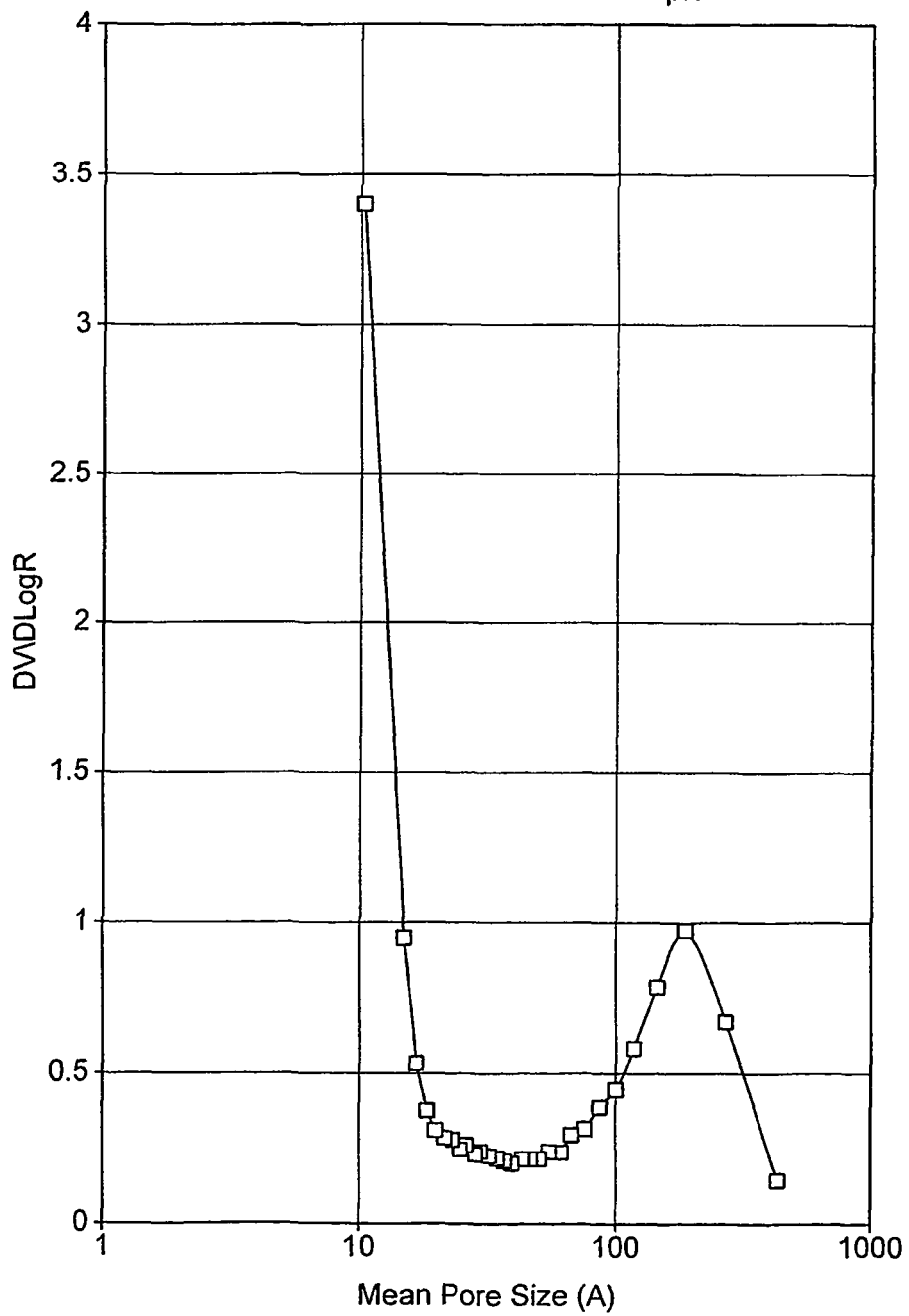

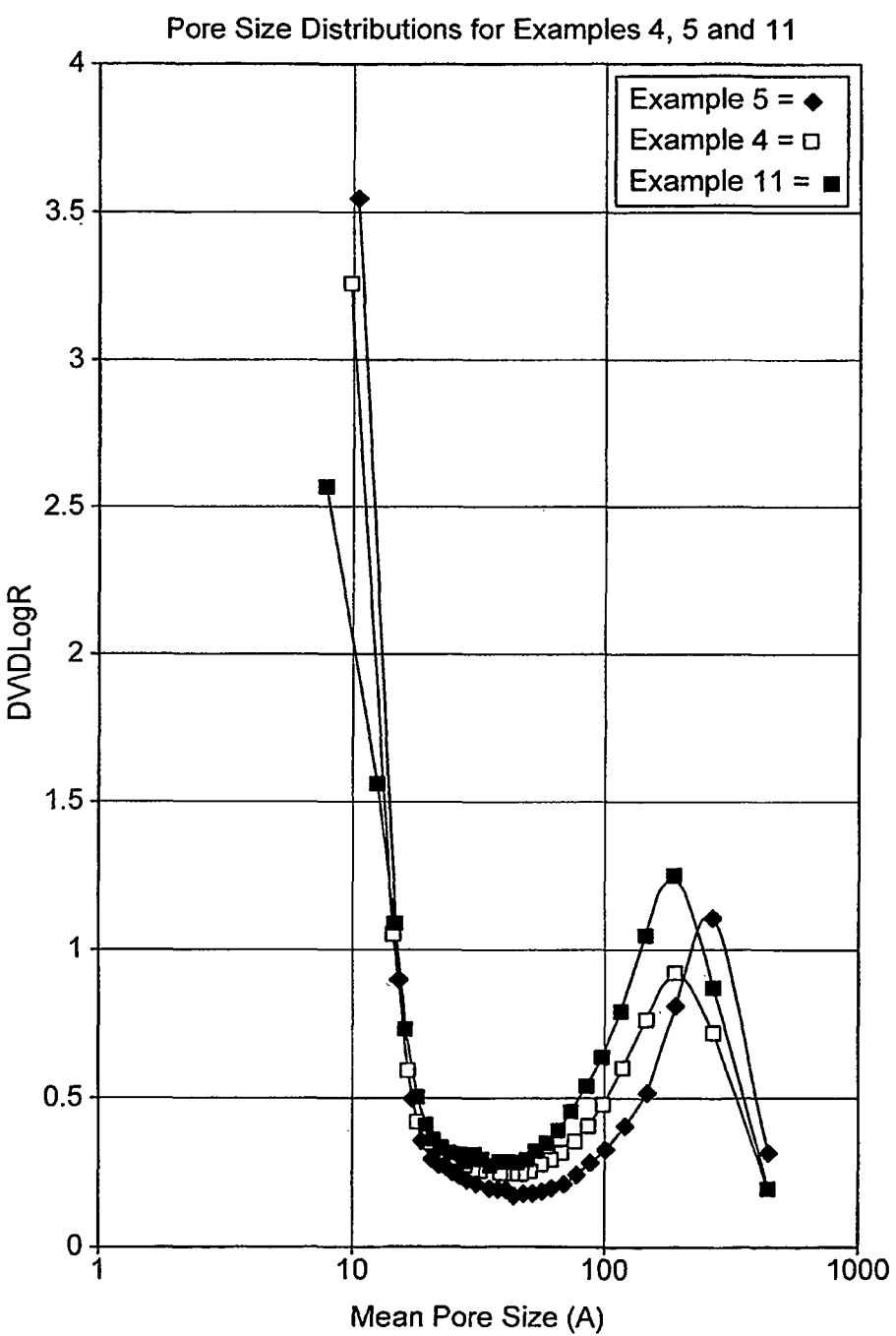

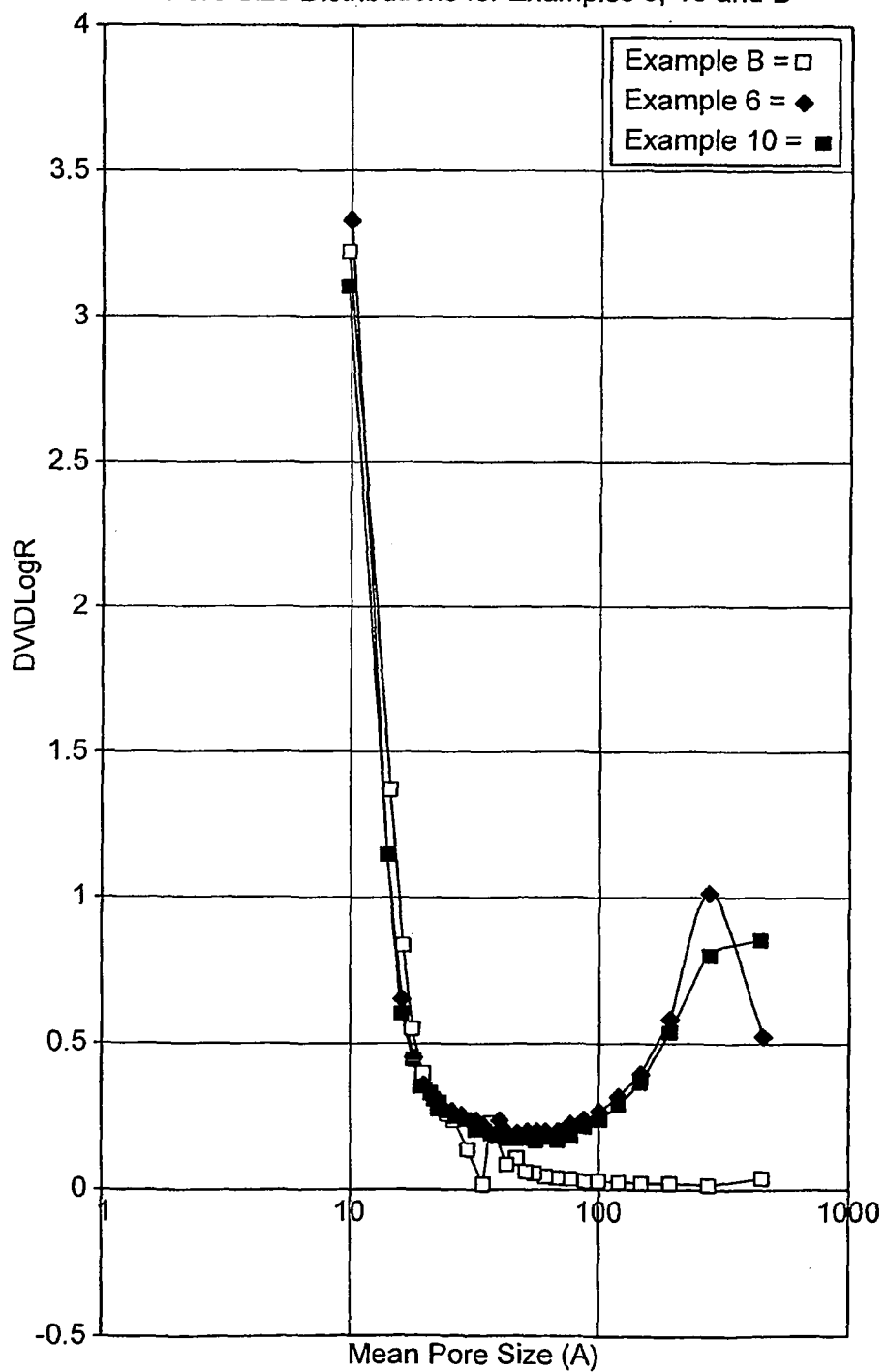

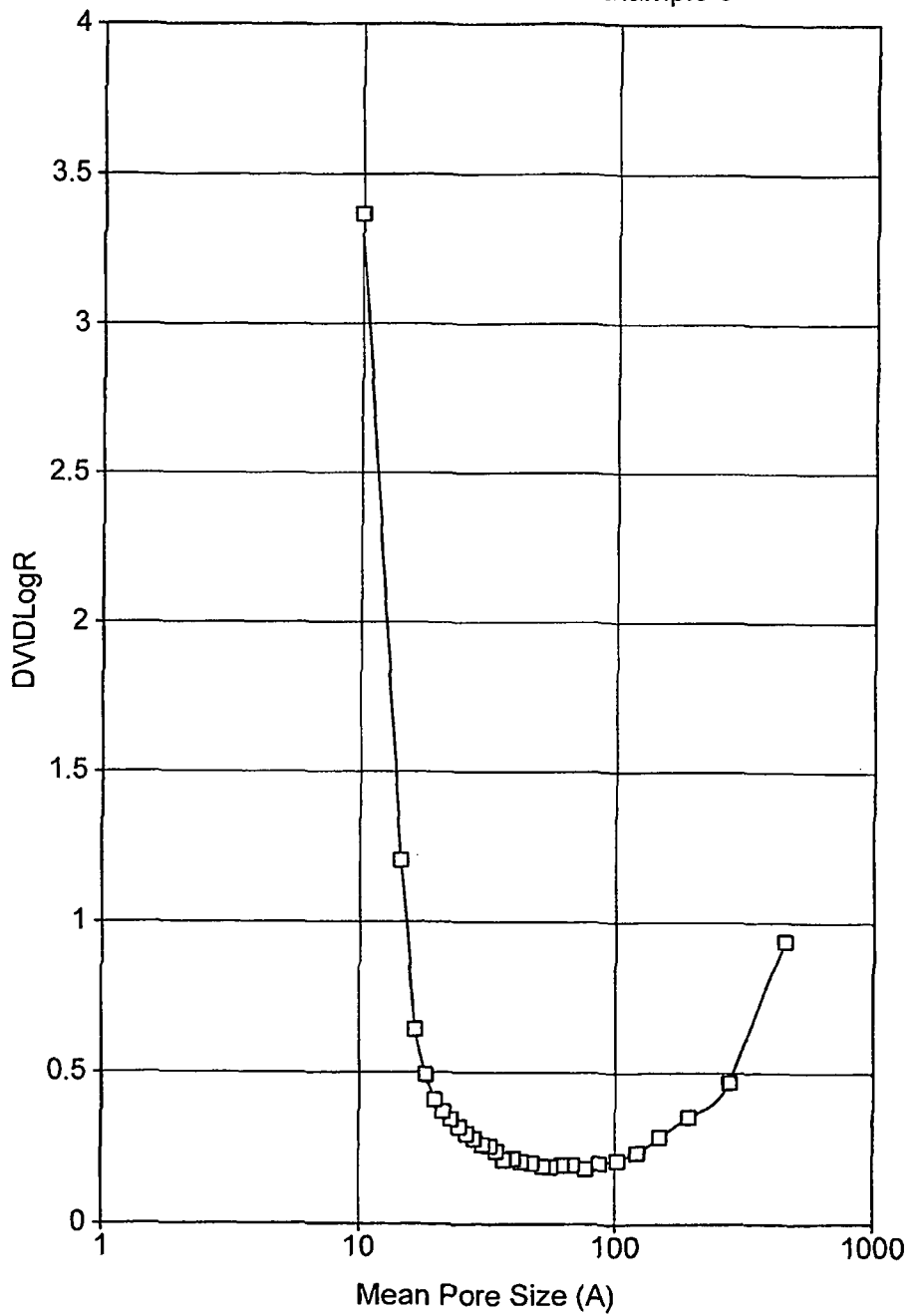

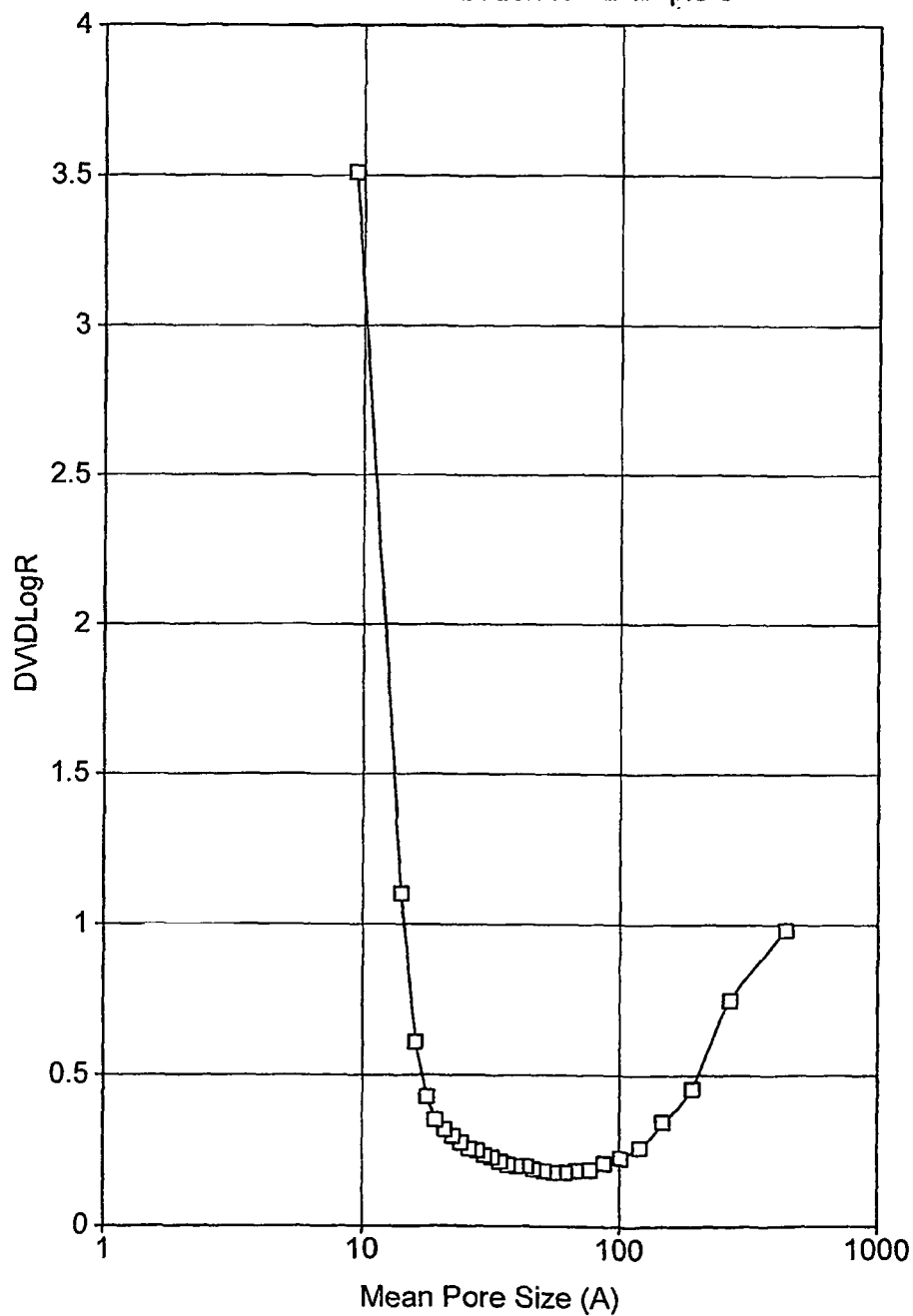

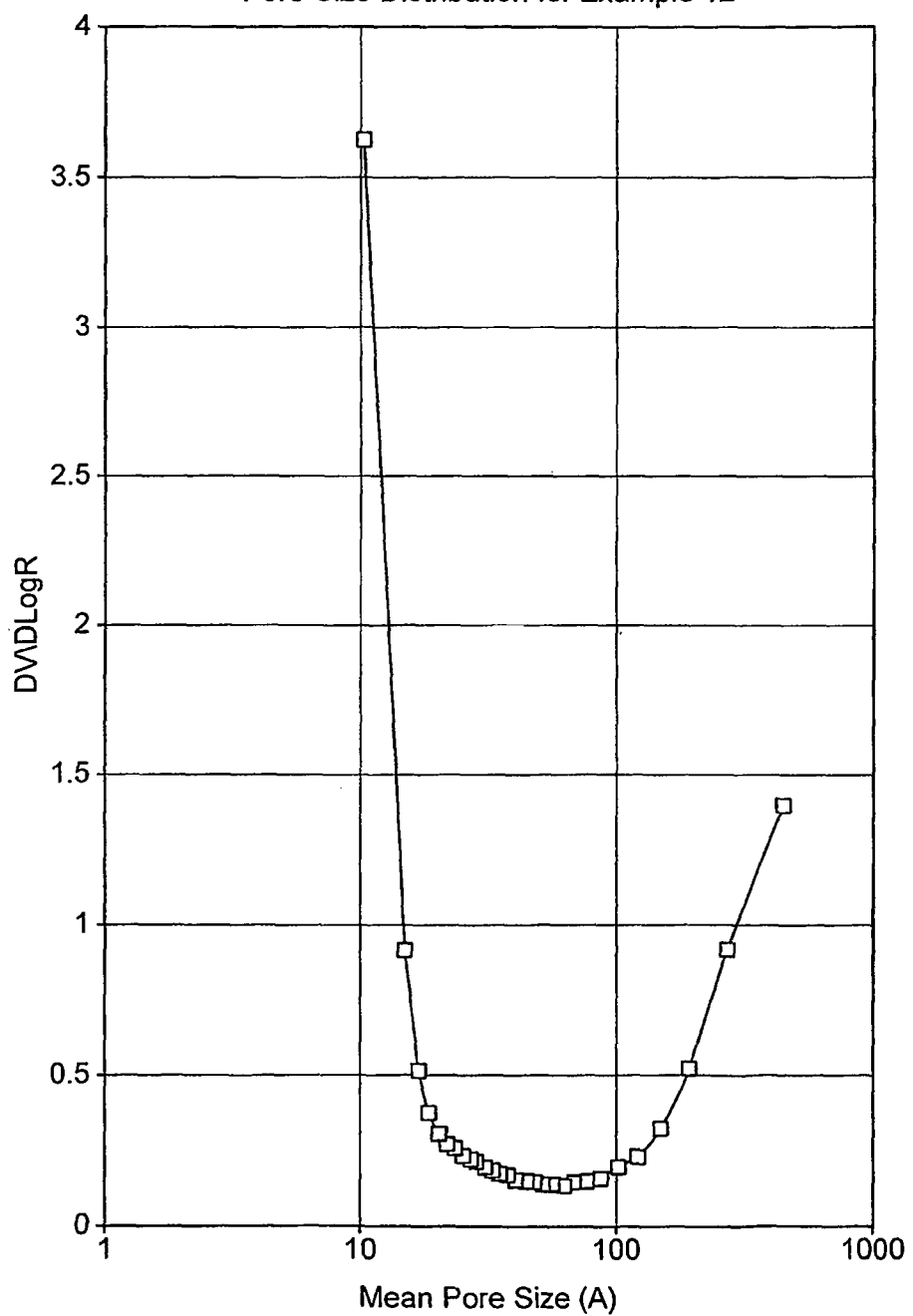

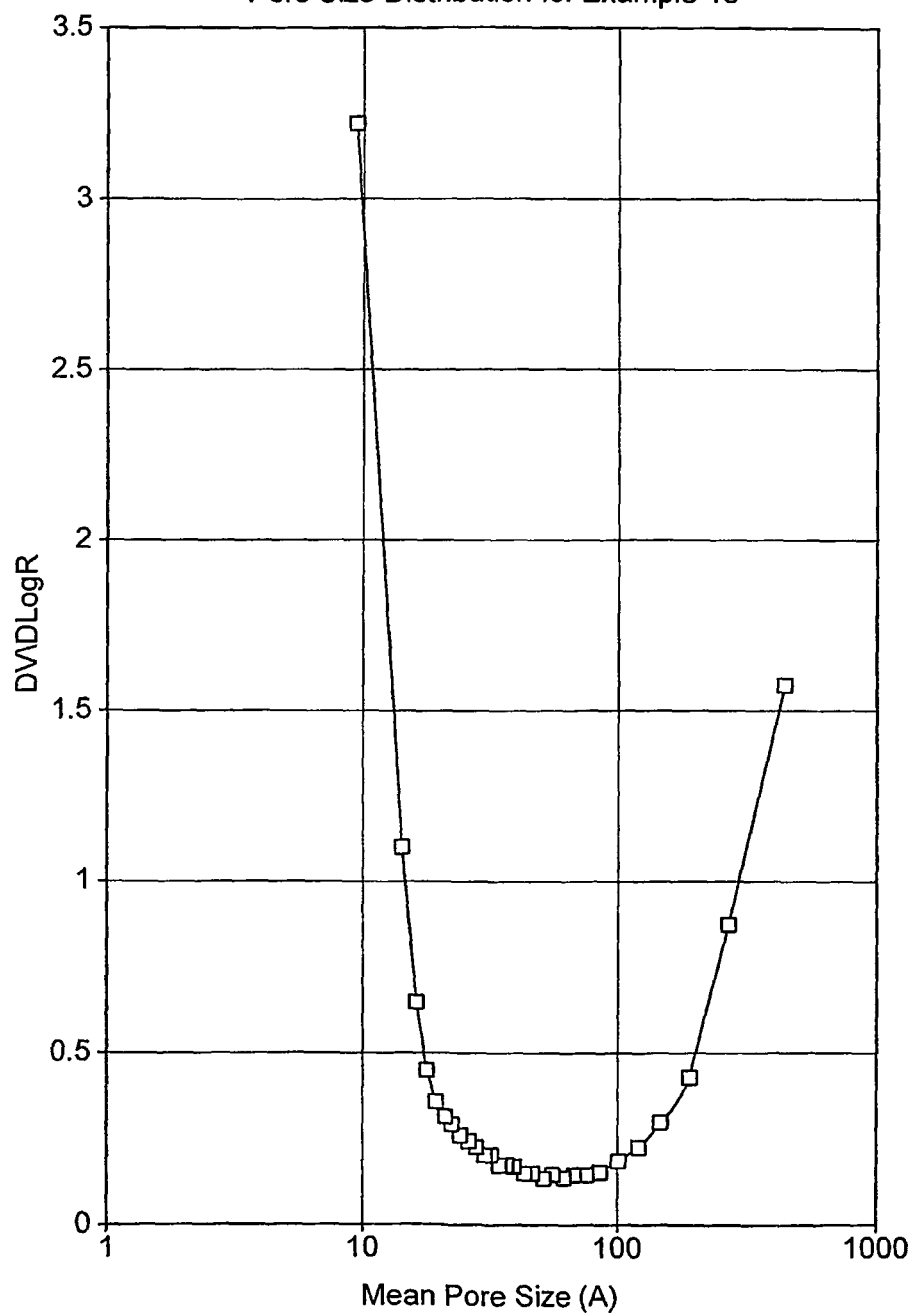

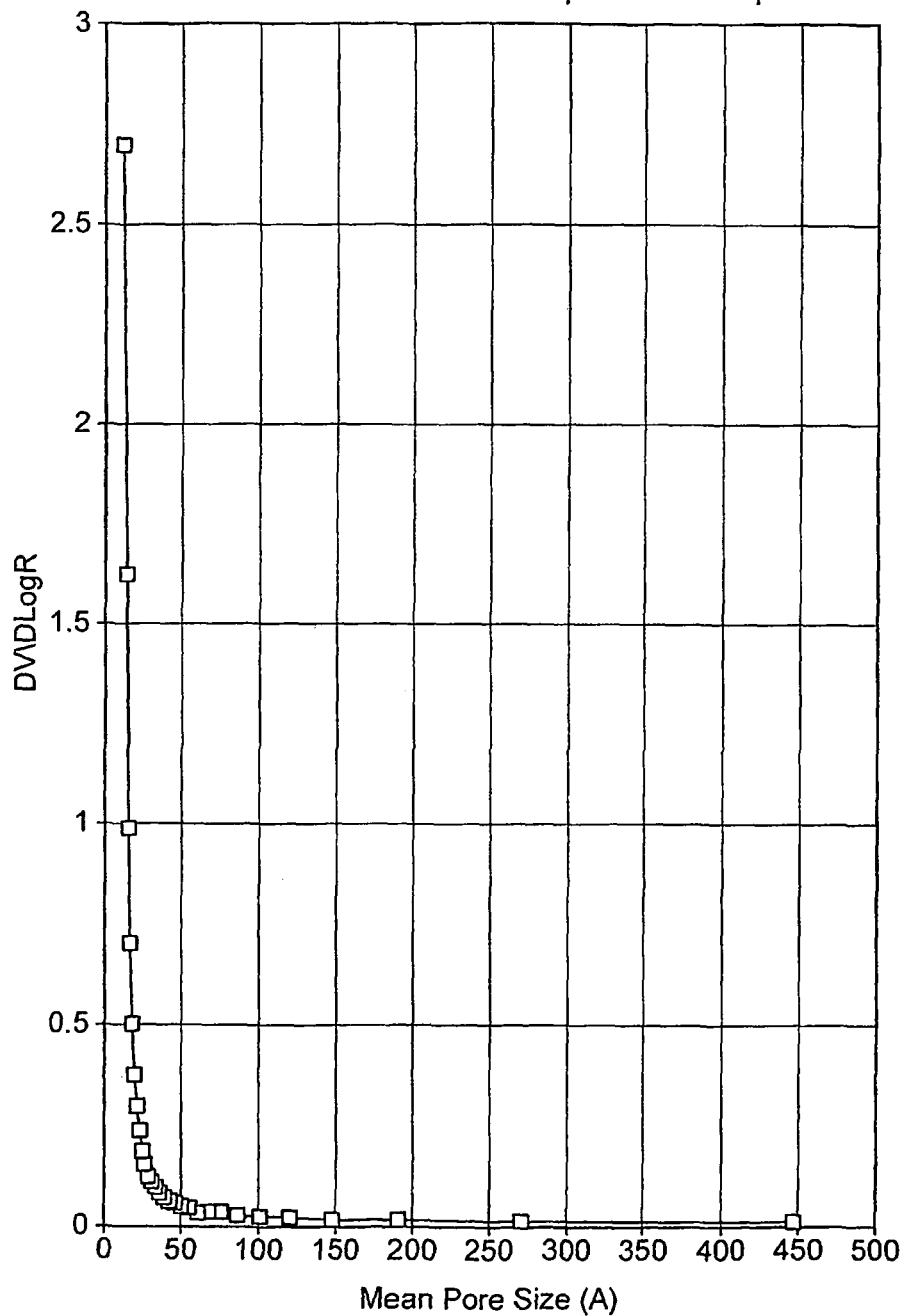

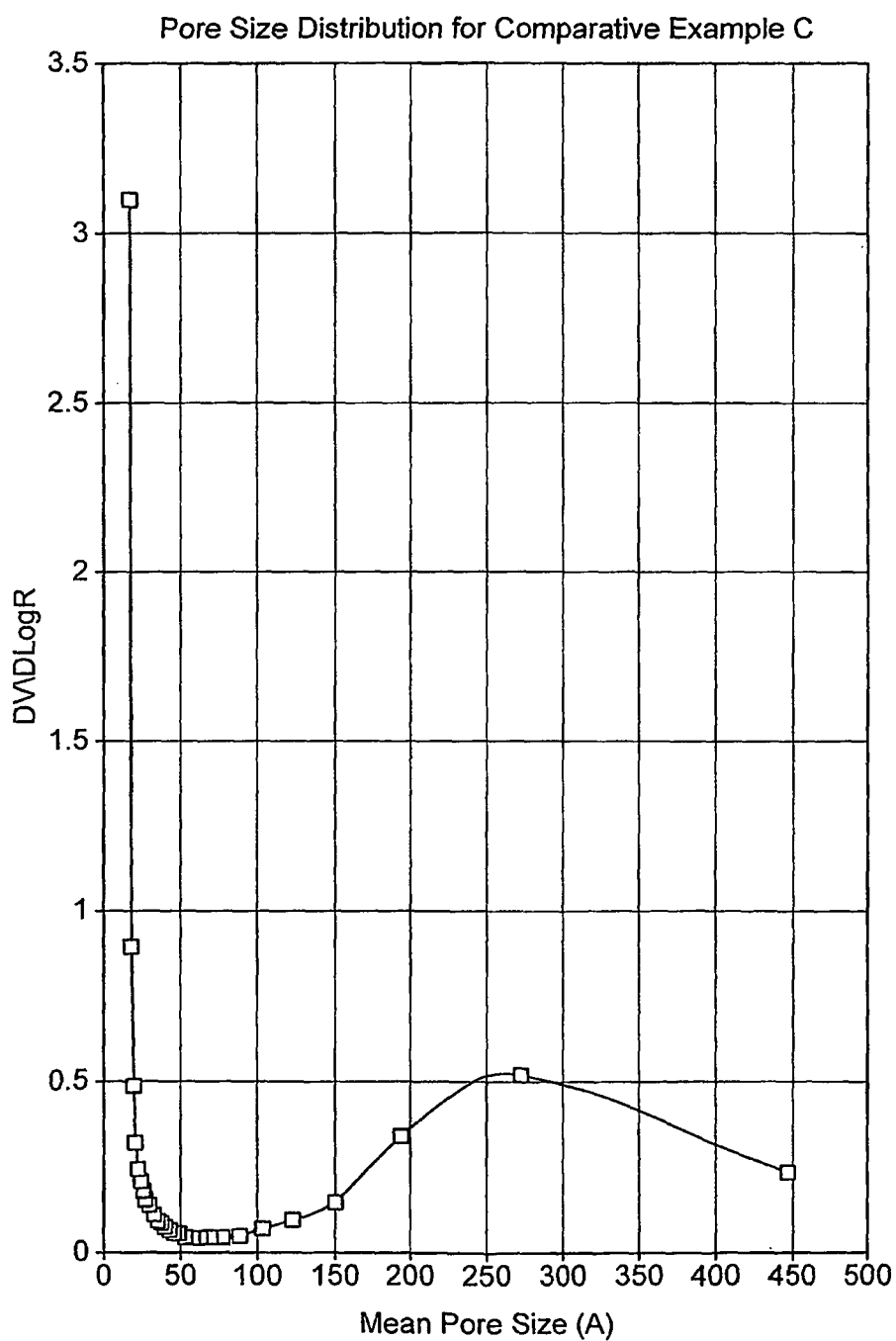

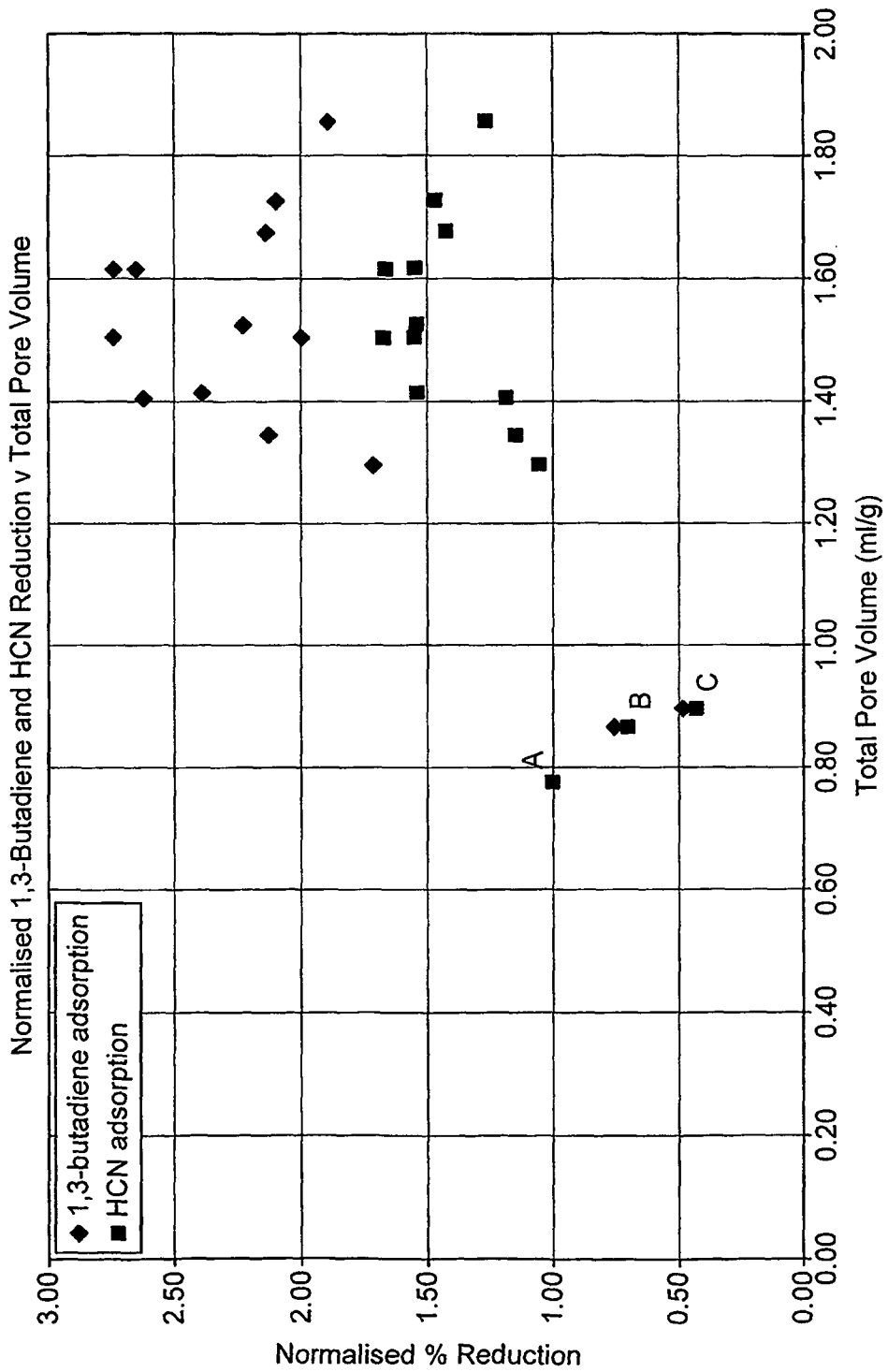

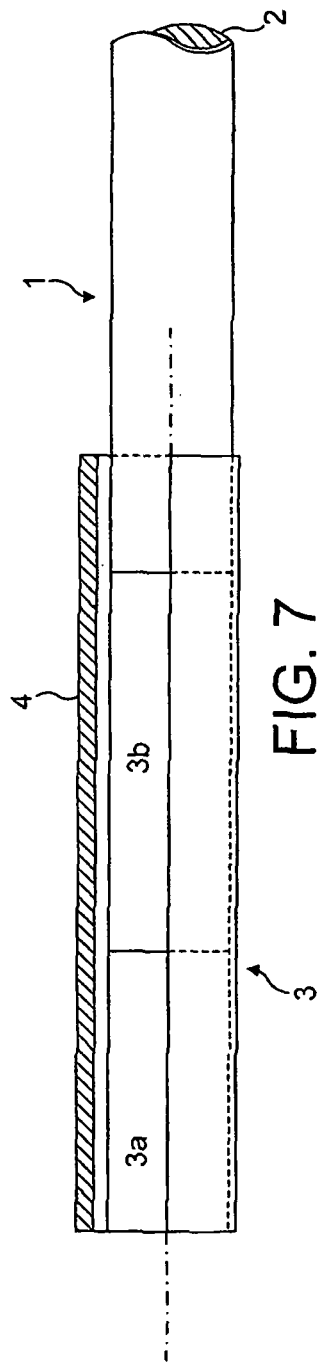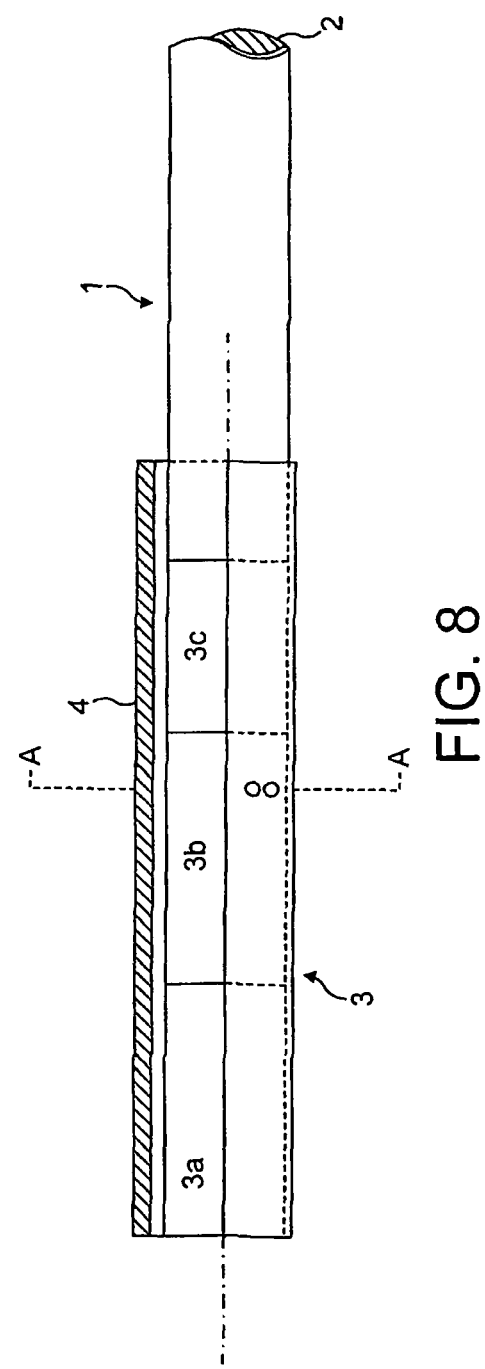

POROUS CARBON MATERIALS AND SMOKING ARTICLES AND SMOKE FILTERS THEREFOR INCORPORATING SUCH MATERIALS

CROSS REFERENCE TO PRIOR APPLICATION

This application is a national stage filing (35 U.S.C. 371) of PCT/GB2006/001102, filed on Mar. 27, 2006, which claims priority to and benefit from Great Britain Patent Application No. 0506278.1, filed on Mar. 29, 2005, currently pending.

This invention relates to porous carbon materials and to smoking articles and smoke filters therefor incorporating such materials.

It is well known to incorporate porous carbon materials in smoking articles and smoke filters therefor in order to reduce the level of certain harmful materials in the smoke. Porous carbon materials may be produced in many different ways. The physical properties of porous carbon materials, including the shape and size of particles, the distribution of particle sizes in a sample, the attrition rate of the particles, the pore size, distribution of pore size, and surface area, all vary widely according to manner in which it has been produced. These variations strongly affect the performance or suitability of the material as an adsorbent in different environments.

Generally, the larger the surface area of a porous material, the more effective it is in adsorption. Surface areas of porous materials are estimated by measuring the variation of the volume of nitrogen adsorbed by the material with partial pressure of nitrogen at a constant temperature. Analysis of the results by mathematical models originated by Brunauer, Emmett and Teller results in a value known as the BET surface area.

Carbon materials may be treated in order to increase their surface areas by a process known as activation. Activation may be effected, for example by heating carbon that has been treated with phosphoric acid or zinc chloride, or by heating the carbon with steam or with carbon dioxide. Activation by carbon dioxide is sometimes followed by an additional air modification step, which involved heating the carbon in air. The activation process removes material from the inner surface of the carbon particles resulting in a reduction in weight, the weight loss being proportional to the period of the treatment.

The distribution of pore sizes in a porous carbon material also affects its adsorption characteristics. In the present patent specification, and in accordance with nomenclature used by those skilled in the art, pores in an adsorbent material are called "micropores" if their pore size is less than 2 nm ($<2\times10^{-9}$ m) in diameter, and "mesopores" if their pore size is in the range 2-50 nm. Pores are referred to as "macropores" if their pore size exceeds 50 nm. Pores having diameters greater than 500 nm do not usually contribute significantly to the adsorbency of porous materials, For practical purposes therefore, pores having diameters in the range 50 nm to 500 nm, more typically 50-300 nm or 50-200 nm, can be classified as macropores.

The relative volumes of micropores, mesopores and macropores in a porous material can be estimated using well-known nitrogen adsorption and mercury porosimetry techniques. Mercury porosimetry can be used to estimate the volume of macro- and mesopores; nitrogen adsorption can be used to estimate the volumes of micro- and mesopores, using the so-called BJH mathematical model. However, since the theoretical bases for the estimations are different, the values obtained by the two methods cannot be compared directly with each other.

Porous carbon may be produced from natural sources. For example, coconut charcoal is obtained by the carbonisation of coconut shell; furnace black is obtained by the pyrolysis or combustion of petroleum residues, and thermal black is produced from natural gas. US and British patent specifications U.S. Pat. No. 3,909,449, U.S. Pat. No. 4,045,368 and GB-1383085 all disclose processes for producing spheres of activated charcoal from pitch.

Porous carbon materials may also be obtained by carbonising organic resins. For example, International patent publication WO 02/12380 discloses a process for producing porous carbon by carbonising an organic resin that has been produced by condensing a nucleophilic component such as a novolak resin, with an electrophilic cross linking agent such as hexamethylene tetramine in the presence of a pore former such as ethylene glycol.

International patent publication WO 01/19904 discloses a process for producing monolithic porous carbon by carbonising an organic resin produced by polymerisation of a system such as resorcinol/formaldehyde, divinylbenzene/styrene vinylidene chloride or vinylidene chloride/divinylbenzene, in the presence of a surfactant.

Porous carbon materials may also be produced by agglomeration of fine carbon particles with binders. For example, U.S. Pat. No. 3,351,071 discloses a process for producing spherical particles of carbon by mixing cellulose crystallite aggregate and active carbon with water in a mill, processing into spheres and drying. The carbon particles can then be activated and used in cigarette filters.

U.S. Pat. No. 4,029,600 discloses a process for producing particulate carbon material by mixing carbon black spheres with a resin binder, and carbonising and then pulverising the mixture.

British patent specification GB-2395650 compares the effect of a number of carbon materials having various micropore and mesopore volumes on the taste of tobacco smoke containing flavourings such as menthol. Carbon materials with a micropore volume of not greater than 0.3 cc/g and a mesopore volume of at least 0.25 cc per gram are stated to adsorb less menthol than materials with different pore size distributions, and are therefore considered to be more suitable for use in a cigarette filter in flavoured cigarettes. International patent publication No WO/03/059096A1 discloses cigarettes comprising a tobacco rod and a filter component having a cavity filled with beaded carbon of spherical form with diameters of from 0.2 to 0.7 mm, BET surface areas in the range 1000-1600 $m^2/g$, and a pore size distribution predominantly in the range of micropores and small mesopores.

In accordance with this invention, we have identified a class of porous carbon materials that are particularly effective in reducing one or more harmful components from tobacco smoke.

The materials of the present invention are characterised by a combination of physical properties.

According to one aspect the present invention there is provided a porous carbon material having a BET surface area of at least 800 $m^2/g$, a density of not more than 0.5 g/cc, a pore structure that includes mesopores and micropores, and a pore volume (as measured by nitrogen adsorption) of at least 0.9 $cm^3/g$.

The porous carbon materials of the invention preferably have a bulk density less than 0.5 g/cc. Typical upper values for the range of densities of the carbon materials of the present invention are 0.45 g/cc, 0.40 g/cc, and 0.35 g/cc. Preferably, the bulk density of the carbon materials of the invention is in the range 0.5 to 0.2 g/cc.

The carbon materials of the invention may also be characterised by their pore structure rather than density.

According to this aspect of the invention, there is provided a porous carbon material having a BET surface area of at least 800 $m^2/g$, a pore structure that includes mesopores and micropores, and a pore volume (as measured by nitrogen adsorption) of at least 0.9 $cm^3/g$, from 15 to 65% of which is in mesopores.

The preferred porous carbon materials of the invention may be also be characterised by a pore structure wherein the pore volume (as measured by nitrogen adsorption) is at least 1.0 $cm^3/g$, but less than 20% of the pore volume is in pores of from 2-10 nm. Usually less than 15%, and often less than 10% of the combined pore volume is in pores of from 2-10 nm n.

The density and pore structure of porous carbon material are closely related. Generally, we have found that in samples of carbon materials of the invention, the higher the combined volume of micro-, meso- and macropores, the lower the density, because pores increase the volume of a given mass of material without increasing its weight. Furthermore, as the density decreases, so the proportion of macro- and mesopores to micropores increases. That is to say, in general, the lower the density of the carbon material of the invention, the higher the proportion of the pore volume in mesopores and macropores compared with the pore volume in micropores. However the correlation between density and pore volume, as determined by nitrogen adsorption, is not precise. Hence, some carbon materials of the invention having the pore structure defined in either of the two preceding paragraphs may have densities greater than 0.5 g/cc, for example densities of up to 0.52, 0.55, 0.60 or 0.65 g/cc. Conversely, some carbon materials of the invention may have densities less than 0.5 g/cc and a pores structure in which less than 15% (e.g. 12%, 10% or 5%) of the combined mesopore and micropore volume is in mesopores.

The lack of complete correlation between density and micro- and mesopore structure arises because the technique of nitrogen adsorption used to estimate pore size distribution is not capable of detecting pore sizes greater than about 50 nm. The total pore volume of a material estimated by nitrogen adsorption techniques therefore corresponds to the combined pore volumes of micropores and mesopores. The macropore volume of a material is not revealed by this technique. Thus, where the carbon materials of the invention have a low density and a relatively low proportion of mesopores, as detected by nitrogen adsorption, the low density is attributable to a relatively high pore volume in the macropore range immediately neighbouring mesopore range, i.e. in the range 50 nm to 500 nm. Whilst pore volumes in the macropore range can be estimated by mercury porosimetry, the results obtained using this technique do not match those obtained using nitrogen adsorption. Hence it is difficult to estimate precisely the pore volume of a material across the full range of pore sizes from 2-500 nm.

The invention also includes a smoking article comprising smoking material and a porous carbon material according to the invention.

The BET surface area of the preferred porous carbon materials of the invention is at least 800 $m^2/g$, preferably at least 900 $m^2/g$, and desirably at least 1000 $m^2/g$. Typical values for BET surface area of carbon materials of the invention are about 1000, 1100, 1150, 1200, 1250 and 1300 $m^2/g$. Porous carbon materials with BET surface areas of up to 1250 $m^2/g$, e.g. 1000-1250 $m^2/g$, are most preferred.

The porous carbon materials of the invention preferably have a pore volume (as estimated by nitrogen adsorption) of at least 0.95 g/cc, and desirably at least 1 g/cc. Carbon materials with pore volumes of at least 1.1 cc/g are particularly useful as an adsorbent for tobacco smoke. Typical values for the pore volumes of the carbon materials of the invention are 1.15 cc/g, 1.2 cc/g, 1.25 cc/g and 1.3 cc/g. Usually, the combined pore volume will be in the range 1.1 to 2.0 cc/g. Carbon materials according to the invention with pore volumes significantly higher than 2.1 cc/g, for example 2.2 or 2.3 cc/g are low in density and are therefore less easy to handle in cigarette production equipment. Such carbon materials are less favourable for use in cigarettes or smoke filters for that reason.

In the preferred carbon materials of the present invention, at least 30% but desirably no more than 65% of the pore volume (as estimated by nitrogen adsorption) is in mesopores. Typical minimum values for the volume of mesopores as a percentage of the combined micropore and mesopore volumes of the carbon materials of the invention are 35%, 40% or 45%. Typical maximum values for such volumes are 65%, 60% and 55%. Preferably the mesopore volume of the carbon materials of the invention is in the range 35-55% of the combined mesopore and micropore volume.

The porous carbon materials of the invention may be obtained from any source. However, porous carbon materials of the invention that are formed from carbonised organic resin are preferred to porous carbon materials obtained from other sources, e.g. coconut charcoal. Examples of suitable resins include hydroxyl-substituted aromatic resins such as those derived from phenol, bis-phenol A, aminophenols or resorcinol, and non-phenolic resins such as those derived from styrene and vinyl pyrolidone or from styrene and divinyl benzene. Hydroxy-substituted aromatic resins are preferred, especially those derived from phenols.

The preferred carbon materials of the invention are obtained by condensing a nucleophilic component with an electrophilic cross-linking agent in the presence of a pore former, as described in WO-A-02/12380 (incorporated herein by reference).

The invention specifically includes a process for producing a porous carbon material comprising the steps of condensing a nucleophilic component with an electrophilic cross linking agent in the presence of a pore former to form a resin, carbonising the resin and activating the resulting carbon material.

The reaction to form the resin may be carried out in the presence of a catalyst. A solvent may also be used, but preferably the pore former also acts as solvent. The nucleophilic component may be, for example, a phenolic resin, such as a novolak resin, or another resin based upon copolymers of phenolic compounds, such as m-amino-phenol, diphenols such as resorcinol, hydroquinone, or amines such as aniline, melamine or urea with aldehydes such as formaldehyde, furfural or salicylaldehyde. The cross linking agent may be, for example, formaldehyde, furfural or hexamethylenetetramine. The pore former may be, for example, a diol, a diol-ether, a cyclic ester, a substituted cyclic or linear amide or an amino alcohols. Ethylene glycol and diethylene glycol are preferred. Details of suitable materials are described in International patent publication No. WO 02/12380 A2, the contents of which are incorporated herein by reference. The preferred resins for use in producing the porous carbon materials of the invention are novolak resins cross-linked with hexamethylene tetramine in the presence of ethylene glycol.

The pore former is preferably used in sufficient quantities to dissolve the components of the resin system. The weight ratio of pore former to the components of the resin system resin is preferably at least 1:1. The cross-linking agent is normally used in an amount of from 5 to 40 parts by weight (pbw) per 100 parts by weight of the nucleophilic components, typically from 10 to 30 (e.g. 10, 15 or 20) pbw cross-linking agent per 100 pbw of nucleophilic component.

The preferred resins have weight-average molecular weights (Mw) in the range of from 300 to 3000 prior to cross-linking. Where novolak resins are used, resins with Mw values at the lower end of this scale are viscous liquids, and at the higher end of the scales are solids with melting points in the region of 100° C. Novolak resins of Mw less than 2000 and preferably less than 1500 form resins which, on carbonisation, tend to produce carbons with desired pore size distributions using lower amounts of pore former.

As described in WO 02/12380 A2 (incorporated herein by reference), the reaction conditions for the resin can be controlled so that the resulting material is in the form of beads with a desired range of particle size. Beads may be formed by pouring a pre-polymer solution of the electrophilic component, the nucleophilic cross-linking agent and the pore former into a hot liquid suspension medium in which the mixture is immiscible, such as mineral oil, agitating the mixture, e.g. by stirring, to form a suspension of resin globules, and allowing the resin to solidify into beads. The mean particle size of the beads will depend upon the agitation process and its intensity, the temperature and viscosity of the suspension medium, the temperature and viscosity of the pre-polymer solution and the volume ratio of the pre-polymer solution and the suspension medium. The precise conditions necessary to achieve a desired particle size can readily be established by routine experiment. The beads are then separated from the suspension medium, thoroughly washed or vacuum dried, and then heated to cause carbonisation.

The pore size distribution of the activated carbon material is affected by a number of factors, including the nature of the electrophilic component and the cross-linking agents used, the presence of a catalyst, the presence of a solvent, and the reaction rate. Higher temperatures and the presence of a catalyst tend to promote higher porosities in the carbon material. Heat transfer in the reaction system also influences porosity. Sudden or rapid temperature changes tend to reduce the formation of micropores, and to favour the formation of mesopores. Separation of the carbon material from the pore former at low temperatures prior to carbonisation, e.g. by washing or vacuum drying, also affects the pore size distribution. Carbon materials that have been treated to remove the pore former before carbonisation have higher mesopore volumes than similar materials in which the pore former is driven off during carbonisation.

Carbonisation of the resin is preferably effected by heating in an inert atmosphere at a temperature of 600-850° C. or more. The resulting carbon material may then be activated for example by treatment in air at 400-450° C., in steam at 750° C. or more or carbon dioxide at 800° C. or more.

We have found that one particular class of porous carbon materials is particularly effective in the adsorption of hydrogen cyanide from the vapour phase of tobacco smoke. These materials are formed by carbonising an organic resin containing nitrogen, for example an organic resin formed by condensing a nucleophilic component with a nitrogen-containing cross-lining agent, such as hexamethylenetetramine or melamine or produced from nucleophilic precursors such as amino phenols.

Without wishing to be limited by any theory, it is considered that when nitrogen-containing organic resin is carbonised, the resulting porous carbon material will contain residual nitrogen or nitrogen sites, with which HCN is believed to interact particularly strongly.

The porous carbon material may be a monolithic structure, adapted for use in a filter for a smoking article. For example the material may be formed into a cylindrical filter element with an axial passage that allow the bulk flow of smoke therethrough whilst bringing the smoke into contact with the carbon material. Preferably however, the porous carbon material is particulate.

When particulate porous carbon material is incorporated in smoking articles such as cigarettes, or a smoke filters therefor, the amount of material for each cigarette or filter must be measured and delivered with high precision. The shape and size of the particles, and the particle size distribution affect the flow and handling of the material. Thus, coconut charcoal has a wide distribution of particle size, and a high attrition rate, and therefore tends to produce dust, which can interfere with the operation of high-speed machinery. Also, since coconut charcoal particles are irregular in shape, it has relatively poor flow characteristics, which creates difficulties in metering the delivery of material into the cigarette or filter.

Preferably the porous carbon material is in the form of microbeads, i.e. generally spherical particles 50-1000 μm in size. The flow characteristics of microbeads are particularly favourable in facilitating handling in the manufacture of smoking articles and smoke filters therefor.

Smoke filters typically comprise a short rod of absorbent material such as cellulose acetate. One method for incorporating particulate porous carbon material in the filter is by forming a tow from the absorbent material, passing the tow continuously through a first station in which the tow is impregnated with a plasticiser such as triacetin, a second station in which particles of porous carbon material are fed from a hopper on to the tow and thence for further processing into a filter element. Provided that the flow of carbon material from the hopper on to the tow, and the rate of movement of the tow are uniform, the loading of the tow with carbon material will also be uniform. Certain carbon materials however, in particular coconut carbon, have poor flow characteristics. The particles tend to stick together due to their irregular and non-uniform shape. Accordingly the loading of the material on to filter tow is difficult to control. Using the particulate porous carbon materials in the form of microbeads, the risk of sticking and of uneven loading of the tow is much reduced.

Another advantage of using particulate porous carbon material formed from organic resins in smoking articles or smoke filter arises from the fact that such materials have relatively low attrition rates compared with natural charcoal. The higher the attrition rate of a particulate material, the more dust it generates during handling. Dust interferes with manufacturing processes, especially high speed processes as used to manufacture cigarettes or cigarette filters. In the production of porous carbon materials from carbonised organic resin, the reaction conditions for the resin can be controlled so that the resulting particles of carbon have a reduced attrition rate as compared, for example, with coconut charcoal.

Another physical property of particulate porous carbon material that affects its suitability for use in smoking articles or smoke filter is its particle size, and more particularly its particle size distribution. The porous carbon materials of the invention preferably have a mean particle size in the range 50-1000 µm, desirably 100-700 µm. For the filtration of tobacco smoke, porous carbon materials with smaller mean particles size, e.g. 150-250 µm, usually perform better than materials with larger mean particle size, e.g. 250-500 µm, which in turn usually perform better than materials with a mean particle in the range 500-1000 µm.

Any sample of particulate material will have a statistical distribution of particle sizes about a mean value. The ratio of the $90^{th}$ percentile (D90) to the $10^{th}$ percentile (D10) gives a measure (D90/D10) of the spread of the distribution of particle size in the sample. For coconut charcoal the mean particle size will typically be in the range 100-1000 µm, with a D90/D10 ratio of 20 or more, a significant proportion of the particles being less than 20 µm in size. This relatively wide particle size distribution can result in uneven distribution of the charcoal in the filter, and a high risk of contamination of manufacturing by dust.

In the production of porous carbon materials from carbonised organic resin, the reaction conditions for the resin can be controlled so that the resulting material has a narrower distribution of particle size as compared, for example, with coconut charcoal. The carbon materials of the invention preferably have a D90/D10 particle size distribution that is at least 10, desirably at least 5, and most advantageously about 2.

Materials that are substantially free of dust create fewer handling and contamination problems in the manufacture of smoking articles and smoke filters. The porous carbon material of the invention is therefore also preferably substantially free of particles smaller than 10 microns. Desirably it is also substantially free from particles smaller than 20 microns, and most advantageously it is free from particles smaller than 30 microns.

The smoking articles of the invention may take any form. For example the smoking article may be one in which the tobacco is smoked by igniting the smoking material and inhaling the products of combustion, as for example in a cigarette, cigar or cigarillo. Alternatively the smoking article may be one in which the smoking material is heated to a temperature at which decomposition in to pyrolysis products occurs without combustion. Such articles are well known and incorporate electrical or other heating means such as a charcoal element.

In particular the smoking article may comprise a rod of smoking material optionally in a wrapper, with or without a filter. The wrapper may be of paper, tobacco leaf or reconstituted tobacco. Alternatively, where, for example, the smoking article is intended to produce low emissions of sidestream smoke, or lower levels of pyrolysis products in the mainstream smoke, the wrapper may be composed of non-combustible inorganic material such as a ceramic material. The filter may be of any suitable material, for example fibrous cellulose acetate, polypropylene or polyethylene, or paper.

The smoking material is preferably tobacco but may be a non-tobacco smoking material. Examples of non-tobacco smoking materials are dried and cured vegetable material, including fruit materials, and a synthetic smoking material such as may be produced from alginates and an aerosol-generating substance such as ethylene glycol. The smoking material may comprise a blend of tobacco and non-tobacco smoking materials. Where the smoking material comprises tobacco, the tobacco may of any suitable type, or a blend thereof, including air-cured, fire-cured, flue-cured, or sun-cured lamina or stem, and may have been processed using any appropriate process. For example, the tobacco may be cut, shredded, expanded or reconstituted. The smoking material may also include conventional additives, such as ameliorants, colorants, humectants (such as glycerol and propylene glycol), and flavourings (such as sugar, liquorice and cocoa).

The porous carbon material may be incorporated in the smoking material. Accordingly, the invention includes smoking material incorporating a porous carbon material having any of the characteristics described above in relation to the invention.

Preferably, the smoking article comprises a filter, and the porous carbon material is incorporated in filter.

The present invention also includes a smoke filter for a smoking article comprising a porous carbon material of the invention. The smoke filter may be in the form of a holder for a smoking article, such as a cigarette or cigar holder, or may be produced as a filter tip for incorporation a smoking article.

The smoke filter may be of any conventional construction. For example it may in the form of a "dalmatian" filter comprising a section of fibrous filter material, such as a cellulose acetate, the porous carbon material being in particulate form and distributed throughout the section. Alternatively the filter may be in the form of a "cavity" filter, comprising multiple sections, the porous carbon material being confined to one such section. For example the porous carbon material may lie between two adjacent section of fibrous filter material.

The smoke filter may also comprise other adsorbent materials such as an ion-exchange resin, a zeolite, silica, alumina or amberlite.

The preferred smoking articles of the invention are cigarettes, comprising a rod of tobacco, wrapper, and a filter, the porous carbon material being incorporated in a filter.

The invention also includes a process for treating decomposition products of a smoking material comprises contacting the decomposition products with a porous carbon material of the invention.

Figure 2:
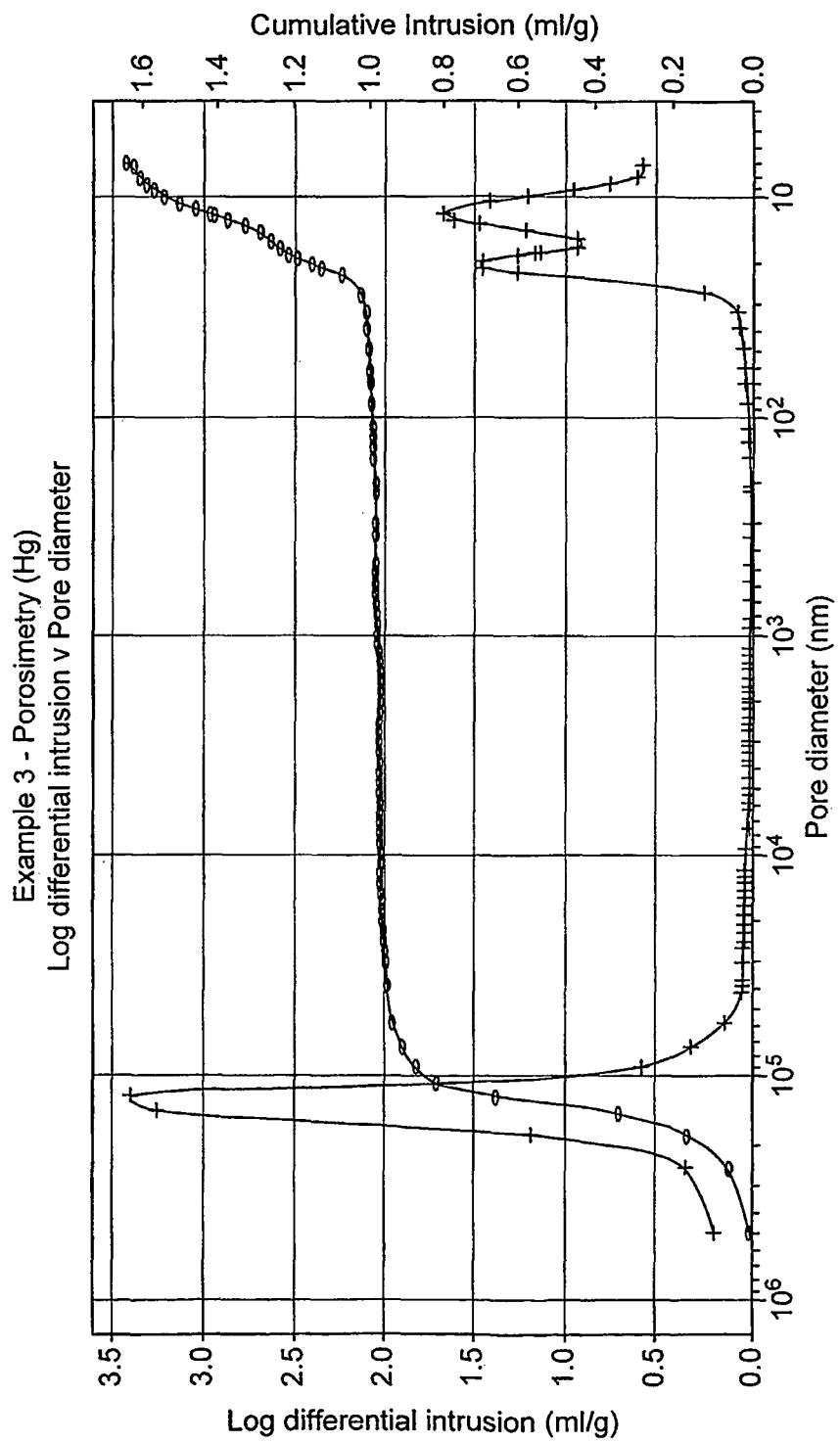
Figure 6:
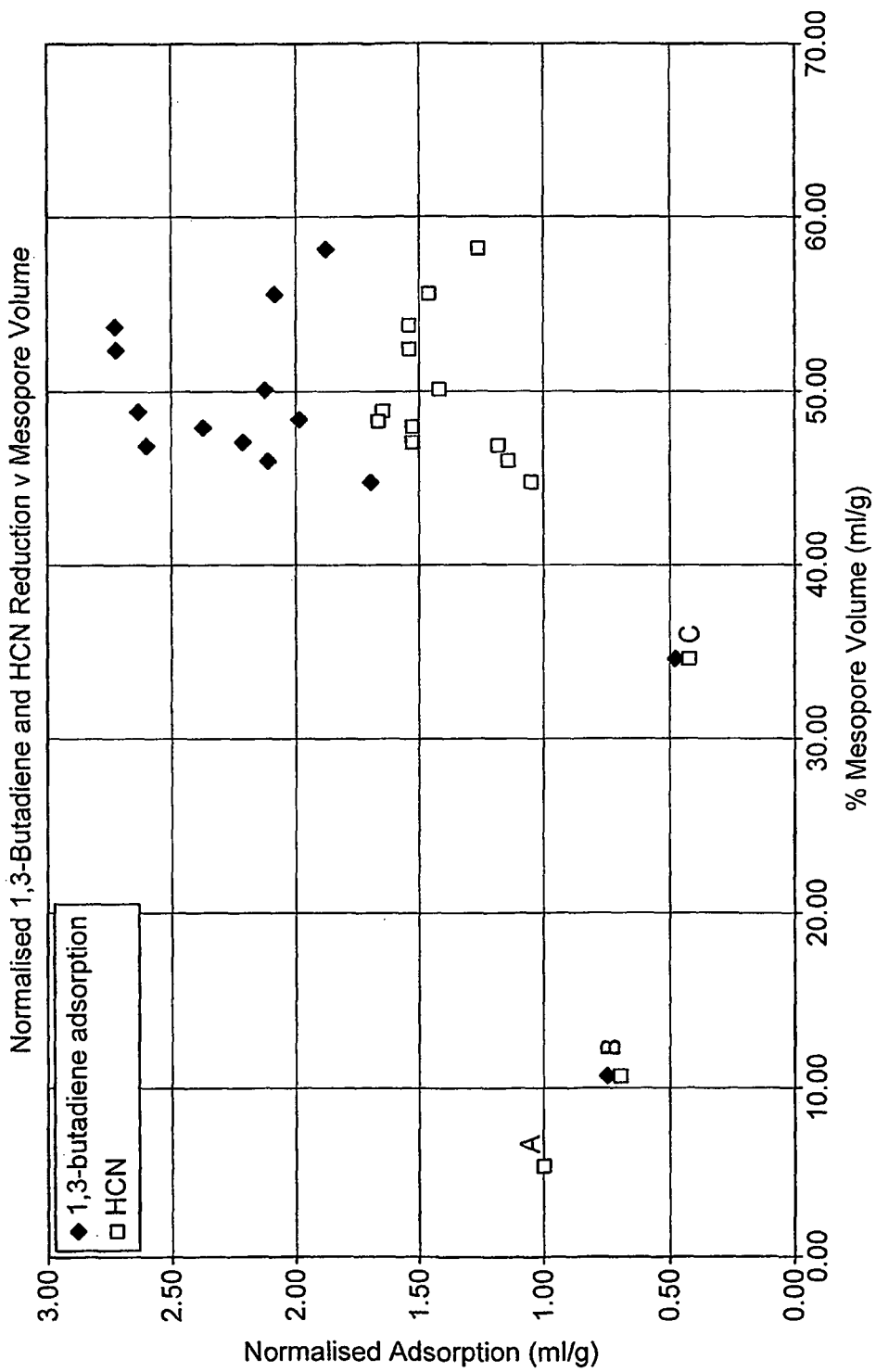

In order that the invention may be better understood, preferred embodiments thereof will now be described, by way of example only—in which reference will be made to the following Figures:

FIG. 1—which is a graph.
FIG. 2—which is a graph.
FIG. 3—which is a graph.
FIG. 4*a*—which is a graph.
FIG. 4*b*—which is a graph.
FIG. 4*c*—which is a graph
FIG. 4*d*—which is a graph.
FIG. 4*e*—which is a graph.
FIG. 4*f*—which is a graph.
FIG. 4*g*—which is a graph.
FIG. 4*h*—which is a graph.
FIG. 4*i*—which is a graph.
FIG. 4*j*—which is a graph.
FIG. 4*k*—which is a graph.
FIG. 5—which is a graph.
FIG. 6—which is a graph.
FIG. 7—which is a diagrammatic representation of a smoking article.
FIG. 8—which is a diagrammatic representation of a smoking article.

Referring to Table 1, samples of organic resins were prepared by mixing 100 parts by weight of the commercially available novolak phenol-formaldehyde resins specified in Table 1 with ethylene glycol pore former in the proportions indicated in Table 1 at elevated temperature and with stirring to enhance the formation of a clear solution, the temperature of which was then stabilised at 65-70° C. Hexamethylene tetramine ("hexamine") cross-lining agent was then added in the proportions indicated in Table 1. The resulting stirred mixture was then heated to the temperature and for the specified reaction time.

The commercial grades of novolak resins used were J1058F available from hexion Specialty Chemicals Inc (formerly Borden Chemical inc), with Mw of about 2400 and containing 5% by weight hexamethylene tetramine, TPR210, with Mw of about 1030, containing salicylic acid to catalyse cross-linking, and J1089F, with Mw of about 1110.

In each case, the resulting viscous solution was poured as a stream with stirring into 2 to 4 times its volume of a preheated (115-120° C.) mineral oil containing 0.5% by volume of a drying oil (known commercially as Danish oil) to retard coalescence. The temperature of resulting emulsion initially dropped to 105-110° C., but on further heating cross-linking occurred at about 115-120° C. Further heating at the rate about 0.5° C. per minute up to 150° C. was applied to complete the reaction. After cooling, the resulting beads of resin were filtered off from the oil and washed several times with hot water to remove the majority of the ethylene glycol and a small amount (less than 5% of total) of low molecular weight polymer. The resulting porous spherical resin, containing water, residual oil, residual pore former and low molecular weight fraction was carbonised by heating at 800° C. to produce spherical porous carbon material. The carbon material was then activated with superheated steam, or carbon dioxide to achieve the weight reduction or "burn-off" indicated in Table 1.

TABLE 1

| Ex. No | Ethylene Glycol (PBW) | Resin Precursor Hexamine (PBW) | Novolak (100 PBW) | Activation Conditions |
|---|---|---|---|---|
| 1 | 200 | 15 | J1058F | Steam at 850° C. |
| 2 | 200 | 11 | " | 34% ($CO_2$ + air modification) |
| 3 | 200 | 11 | " | 34% ($CO_2$) |
| 4 | 200 | 11 | " | 38 |
| 5 | 200 | 11 | " | 34% ($CO_2$) |
| 6 | 300 | 11 | " | 33% ($CO_2$) |
| 7 | 200 | 15 | " | 37% ($CO_2$) |
| 8 | 400 | 11 | " | 36% ($CO_2$ + air modification) |
| 9 | 400 | 11 | " | 36% ($CO_2$) |
| 10 | 600 | 11 | " | 36% ($CO_2$) |
| 11 | 200 | 11 | " | 53% ($CO_2$) |
| 12 | 400 | 11 | " | 37% ($CO_2$) |
| 13 | 400 | 11 | " | 37% ($CO_2$ + air modification) |

The resulting beads exhibited high durability and very low attrition rate as compared with carbon derived from coconut shell. In particular, when physically handled, the beads had little or no soiling effect on the hands when rubbed, and when physically agitated formed very little dust. The beads also had excellent flow characteristics, the spherical shape of the beads causing the material to flow easily and to form much flatter heaps, i.e. conical piles with a much lower slump angle, or angle of repose, than natural carbon.

For the purposes of comparison, two further samples of carbon material (comparative Examples B and C) were prepared by a technique similar to that described above, using the ingredients and activation conditions referred to in Table 2. A sample of commercially available coconut charcoal, grade 208C was also used for the purposes of comparison (comparative Example A).

TABLE 2

| Ex. No | Pore former | Resin Precursor Cross-linking agent | Resin | Activation Conditions |
|---|---|---|---|---|
| B | 100 pbw ethylene glycol | 11 pbw hexamine | 100 pbw Novolak J1058F | 36% ($CO_2$) |
| C | water | | m-amino-phenol-formaldeyde | 27% ($CO_2$) |
| A | Activated coconut charcoal grade 208C | | | — |

FIGS. 1 to 3 show the distribution of pore size as determined by mercury porosimetry for the porous carbon materials of Examples 3 and 9, and comparative Example A (coconut charcoal). In each graph, the left-hand ordinate indicates the logarithm (log) of the differential intrusion of mercury into the sample in ml/g, the right hand ordinate indicates the cumulative intrusion of mercury in ml/g and the abscissa indicates, on a logarithmic scale, the pore size diameter in nanometers over the range 5 nm-1×10$^6$ nm. The large peak to the left hand side of each graph is caused by the intrusion of mercury into the gaps between individual particles within the sample. The peaks towards the right hand side of the graph are caused by the intrusion of mercury into the micro, meso and macropores.

FIGS. 4a-k show the distribution of pore size for the samples of the material as determined by nitrogen adsorption. In these drawings, the mean pore size in Angstrom units is plotted on a logarithmic scale on the abscissa against a value indicative of the number of pores of a particular size obtained from nitrogen adsorption studies, which is the differential of the pore volume with respect to the logarithm of the pore size (dV/d log R).

The BET surface area and porosity of the activated porous carbon materials described in Tables 1 and 2 are shown in Table 3, and the corresponding properties of comparative samples A, B and C are shown in Table 4. The BET surface areas were calculated using the BET method over a range of partial pressure for nitrogen (P/$P_o N_2$) of from 0.07-0.3. The figures shown for nitrogen adsorption is the quantity of nitrogen in milliliters adsorbed under ambient conditions per gram of carbon sample at a relative nitrogen pressure (P/Po) of 0.98, but normalised by the specific gravity of liquid nitrogen at corresponding temperature.

TABLE 3

| Ex No | Bead size (μm) | BET Surface area sq m/g | Nitrogen absorption cc/g | Bulk Density g/cc | Total Pore Volume cc/g (by $N_2$) | Mesopore volume cc/g (by $N_2$) | Micropore volume cc/g (by $N_2$) | % Micropore (by $N_2$) | % Mesopore (by $N_2$) |
|---|---|---|---|---|---|---|---|---|---|
| 1 | 250-500 | 918 | 1.05 | | 1.26 | 0.66 | 0.60 | 47.62 | 53.38 |
| 2 | 250-500 | 1077 | 1.04 | 0.41 | 1.30 | 0.58 | 0.72 | 55.38 | 44.62 |
| 3 | 250-500 | 1094 | 1.09 | 0.41 | 1.35 | 0.62 | 0.73 | 54.07 | 45.93 |
| 4 | 250-500 | 1155 | 1.16 | 0.59 | 1.41 | 0.66 | 0.75 | 53.19 | 46.81 |

TABLE 3-continued

| Ex No | Bead size (μm) | BET Surface area sq m/g | Nitrogen absorption cc/g | Bulk Density g/cc | Total Pore Volume cc/g (by $N_2$) | Mesopore volume cc/g (by $N_2$) | Micropore volume cc/g (by $N_2$) | % Micropore (by $N_2$) | % Mesopore (by $N_2$) |
|---|---|---|---|---|---|---|---|---|---|
| 5 | 150-250 | 1057 | 1.14 | 0.39 | 1.42 | 0.68 | 0.74 | 52.11 | 47.89 |
| 6 | 250-500 | 1165 | 1.25 | 0.27 | 1.51 | 0.73 | 0.78 | 51.66 | 48.34 |
| 7 | 250-500 | 1057 | 1.23 | 0.36 | 1.51 | 0.79 | 0.72 | 47.68 | 52.32 |
| 8 | 250-500 | 1203 | 1.27 | 0.23 | 1.53 | 0.72 | 0.81 | 52.94 | 47.06 |
| 9 | 250-500 | 1230 | 1.36 | 0.23 | 1.62 | 0.79 | 0.83 | 51.23 | 48.77 |
| 10 | 250-500 | 1139 | 1.37 | 0.25 | 1.62 | 0.87 | 0.75 | 46.30 | 53.70 |
| 11 | 250-500 | 1466 | 1.48 | 0.33 | 1.68 | 0.84 | 0.84 | 50.00 | 50.00 |
| 12 | 500-1000 | 1085 | 1.44 | 0.22 | 1.73 | 0.96 | 0.77 | 44.51 | 55.49 |
| 13 | 500-1000 | 1186 | 1.60 | 0.20 | 1.86 | 1.08 | 0.78 | 41.94 | 58.06 |

TABLE 4

| Ex No | Bead size (μm) | BET Surface area sq m/g | Nitrogen absorption cc/g | Bulk Density g/cc | Total Pore Volume cc/g | Mesopore volume cc/g | Micropore volume cc/g | % Micropore | % Mesopore |
|---|---|---|---|---|---|---|---|---|---|
| A |  | 996 | 0.55 | 0.5 | 0.78 | 0.04 | 0.74 | 94.87 | 5.13 |
| B | 250-500 | 1040 | 0.6 | 0.61 | 0.87 | 0.09 | 0.78 | 89.66 | 10.34 |
| C | 250-500 | 726 | 0.65 | 0.59 | 0.9 | 0.31 | 0.59 | 65.56 | 34.44 |

Table 5 gives further details of the pore size distribution of Examples 2, 3, 4, 7, 8, 9, 12 and 13, and of comparative examples A and C.

TABLE 5

Pore Size Distribution ($N_2$ adsorption).
(% of total pore volume by pore size)

| Example No | >10 nm | 5-10 nm | 2-5 nm | <2 nm |
|---|---|---|---|---|
| 2 | 34.62 | 5.38 | 7.69 | 52.31 |
| 3 | 36.30 | 6.67 | 6.67 | 50.37 |
| 4 | 34.04 | 8.51 | 7.80 | 49.65 |
| 7 | 46.00 | 4.00 | 5.33 | 44.67 |
| 8 | 39.87 | 3.92 | 7.84 | 48.37 |
| 9 | 42.59 | 3.09 | 5.56 | 48.77 |
| 12 | 51.45 | 2.31 | 4.05 | 42.20 |
| 13 | 53.76 | 2.15 | 4.84 | 39.25 |
| A | 1.28 | 1.28 | 7.69 | 89.74 |
| C | 31.11 | 1.11 | 5.56 | 62.22 |

It can be seen from the above Tables and FIGS. 1-4a-k that the carbon materials of the invention have distribution of pore sizes that extends over the micro-, meso- and, sometimes, macropore ranges. Although nitrogen adsorption cannot be used to estimate macropore volumes, the presence of significant macropore volumes is indicated by from the positive slope of the pore size distribution curve towards the upper end of the measurement range of nitrogen adsorption, as seen for Examples 8 (FIG. 4f), 9 (FIG. 4g), 10 (FIG. 4e) 12 (FIG. 4g) and 13 (FIG. 4i). The presence of macropores can be confirmed by mercury porosimetry studies, as shown in FIGS. 2 and 3.

It can also be seen from the nitrogen adsorption measurements that there is a clear minimum in the pore size distribution of the carbon materials of the Examples of the invention, in each case in the range 2-10 μm. Within this range the mesopores account for less than 20% of the combined meso and micropore volumes, usually less than 15% and more often less than 10% of the combined volume.

The effect of the carbon materials of the examples upon tobacco smoke was tested by preparing standard cigarettes comprising a paper-wrapped rod of US blended style tobacco and a smoke filters 27 mm in length connected to the rod by a tipping paper. Each filter was composed of two cellulose acetate plugs separated by a 3-5 mm cavity containing a 60 mg sample of the material, the length of the cavity being adjusted to accommodate the sample snugly. The cigarettes were smoked to within 3 mm of the end of the tipping paper in a conventional cigarette smoking engine according to an ISO standard smoking regime. The levels of volatile carbonyl compounds were estimated by trapping the whole mainstream smoke for each cigarette in 2,4-dinitrophenyl hydrazine stabilised with a buffer, and analysed for aldehydic components by liquid chromatography (HPLC) with an ultra-violet detection system. Levels of vapour phase components of the smoke were estimated by passing the mainstream smoke through a 44 mm Cambridge filter pad to remove particulate material, collecting the vapour phase of the smoke in a 31 Tedlar bag, and analysing the vapour by GCMS. Levels of hydrogen cyanide (HCN) in the smoke were estimated by trapping the whole mainstream smoke in an aqueous solution of sodium hydroxide and subjecting the solution to continuous flow analysis. Each test was repeated on four samples, and the averages calculated in each case. For each sample, comparative tests were performed using a control sample, comprising a cigarette with an identical filter having an empty cavity 4 mm in length, and a sample with a cavity containing 60 mg of coconut charcoal.

Table 6 summarises the analytical results for 1,3-butadiene and hydrogen cyanide (HCN). In order to compare the performances conveniently with respect to coconut charcoal, the results for each sample were normalised with respect to the results for the coconut charcoal. The normalised data is plotted in FIGS. 5 and 6, which are scatter charts plotting the percentage reduction in 1,3-butadiene and HCN, normalised with respect to the coconut charcoal of comparative example A, against the total combined volume of meso- and micropores, and the % micropore volume respectively.

TABLE 6

| Example No | % 1,3-Butadiene Reduction v. control | % 1,3-Butadiene Reduction Normalised to Example A | % HCN Reduction v. control | % HCN Reduction Normalised to Example A |
|---|---|---|---|---|
| 2 | 46.09 | 1.70 | 54.09 | 1.05 |
| 3 | 57.34 | 2.12 | 58.55 | 1.14 |
| 4 | 70.68 | 2.61 | 60.77 | 1.18 |
| 5 | 64.25 | 2.38 | 78.56 | 1.53 |
| 6 | 53.74 | 1.99 | 85.22 | 1.66 |
| 7 | 73.94 | 2.73 | 79.38 | 1.54 |
| 8 | 60.03 | 2.22 | 78.83 | 1.53 |
| 9 | 71.48 | 2.64 | 84.62 | 1.65 |
| 10 | 73.94 | 2.73 | 79.38 | 1.54 |
| 11 | 57.50 | 2.13 | 73.18 | 1.42 |
| 12 | 56.58 | 2.09 | 75.01 | 1.46 |
| 13 | 50.72 | 1.88 | 64.82 | 1.26 |
| A | 27.05 | 1.00 | 51.41 | 1.00 |
| B | 20.33 | 0.75 | 36.22 | 0.70 |
| C | 12.88 | 0.48 | 22.24 | 0.43 |

As can be seen from the data and FIGS. 5 and 6, the carbon materials of the invention, with higher total pore volumes and higher proportions of mesopore volumes than coconut charcoal performed significantly better in relation to the adsorption of HCN and, especially 1,3-butadiene, from tobacco smoke.

The materials tested showed similar adsorption characteristics relative to Examples A, B and C for acreolin, propionaldehyde, crotonaldehyde, methyl-ethyl ketone and butyraldehyde.

Table 7 summarises the properties of five further examples of carbon materials according to the invention in the form of microbeads (Examples 14-18), together with two comparative examples, also in the form of microbeads in the same particle size range (Examples D and E). All the beads had a particle size in the range 250-500 microns.

The carbon material of Example 14 is similar to that of comparative example C, and was prepared from a resin (MAP) produced by polymerising m-amino-phenol and formaldehyde in the presence of water as pore former, but the beads were subjected to more extensive activation in carbon dioxide to achieve a higher surface area Whilst mesopores form a relatively low proportion of the combined meso- and micropore volume of this sample, its bulk density is also low, indicating that a significant pore volume lies in small macropores, not detected by nitrogen adsorption.

The carbon material of example 15 was prepared by carbonising a commercially-available polymer of styrene and divinyl pyrolidone (SDP) and activating in carbon dioxide.

The carbon material of Example 16 was prepared from a phenol-formaldehyde resin (PF) obtained by polymerising 100 pbw phenol and formaldehyde in the presence of 200 pbw ethylene glycol as pore former, without any additional cross-linking agent. The resulting polymer was washed, carbonised and then activated in carbon dioxide to achieve 40% burn-off.

The carbon material of Example 17 was prepared from a phenol formaldehyde (PF) resin obtained in a similar manner to that of Example 16, but using 175 pbw ethylene glycol, with additional washing and in carbon dioxide to achieve a burn off of 36%.

The carbon material of Example 18 was prepared from a phenol formaldehyde (PF) resin in a similar manner to that of Example 17, using 150 pbw ethylene glycol. Like the material of Example 14, mesopores form a relatively low proportion of the combined meso- and micropore volume of this sample, yet its bulk density is also low, indicating that a significant pore volume lies in small macropores, not detected by nitrogen adsorption.

The carbon material of comparative Example D was prepared using a styrene vinyl pyrolidene polymer similar to that used in Example 15. The resulting material had a lower combined micro and mesopore volume and a relatively high density.

The carbon material of comparative Example E was prepared using a phenol-formaldehyde resin obtained in a manner similar to that of Example 17. The resulting material had a lower proportion of mesopore volume, and a higher density.

The performances of the carbon materials in reducing formaldehyde, acetaldehyde, 1,3-butadiene and HCN components of tobacco smoke was tested, using the same test procedures as described above. The results are also set forth in Table 7. The performances are evaluated in terms of the % reductions of the analytes in the tobacco smoke, normalised with respect to the corresponding reductions measured using coconut shell carbon.

It can be seen that the carbon materials according to the invention perform better with respect to coconut shell carbon in the removal of at least three out of the four the smoke analytes tested, and that the comparative examples performed worse than coconut shell carbon in relation to all four of the analytes.

TABLE 7

| Ex No | Resin | BET S.A. m²/g | Bulk Density g/cc | Mesopore vol. cc/g | Micropore vol cc/g | Combined pore vol cc/g | % mesopore vol | Normalised % reductions | | | |
|---|---|---|---|---|---|---|---|---|---|---|---|
| | | | | | | | | Formaldehyde | Acetaldehyde | 1,3-butadiene | HCN |
| 14 | MAP | 1059 | 0.35 | 0.16 | 0.75 | 0.91 | 17.6 | 1.26 | 1.09 | 0.79 | 1.66 |
| 15 | SVP | 1638 | 0.36 | 0.50 | 0.91 | 1.41 | 35.5 | 0.54 | 1.04 | 2.06 | 1.01 |
| 16 | PF | 1055 | 0.25 | 0.90 | 0.57 | 1.47 | 61.2 | 2.00 | 1.62 | 2.71 | 1.54 |
| 17 | PF | 1119 | 0.33 | 0.83 | 0.77 | 1.60 | 51.9 | 1.09 | 1.07 | 1.80 | 0.96 |
| 18 | PF | 1075 | 0.30 | 0.05 | 0.97 | 1.02 | 4.90 | 1.42 | 1.42 | 2.26 | 1.08 |
| D | SVP | 1048 | 0.51 | 0.22 | 0.64 | 0.86 | 25.6 | 0.52 | 0.48 | 0.40 | 0.69 |
| E | PF | 1085 | 0.60 | 0.13 | 0.81 | 0.94 | 13.8 | 0.67 | 0.67 | 0.60 | 0.32 |

Specific embodiments of smoking articles and smoke filters according to the invention will now be described by way of example only with reference to FIGS. 6 and 7 in which FIG. 6 is a side elevation, partly in longitudinal cross-section and partially broken away of a smoking article with a smoke filter according to the invention FIG. 7 is a similar view to FIG. 6 of a smoking article with an alternative smoke filter according to the invention.

In the drawings, which are not to scale, similar features are given like reference numerals.

Referring to the drawings, FIGS. 7 and 8 illustrate smoking articles in the form of cigarettes having a rod 1 of tobacco encased in a wrapper 2 attached to a smoke filter 3 by means of a tipping paper 4. For clarity, the tipping paper 4 is shown spaced from the wrapper 2, but in fact they will lie in close contact.

In FIG. 7, the smoke filter 3 comprises two cylindrical filter elements 3a and 3b. The first filter element 3a at the mouth end of the filter is 15 mm in length, composed of cellulose acetate tow impregnated with 7% by weight of triacetin plasticiser having a 25 mm water gauge pressure drop over its length. The second filter element 3b, positioned adjacent the rod 1 is 12 mm in length, has a 90 mm water gauge pressure drop over its length, and comprises 80 mg cellulose acetate tow impregnated with 4% by weight of triacetin and has 30 mg of an activated porous carbon material according to the invention distributed evenly throughout its volume in a "Dalmatian" style.

The cigarette shown in FIG. 8 is similar to that of FIG. 7 except that the smoke filter 3 has three coaxial, cylindrical filter elements 3a, 3b and 3c. The first filter element 3a at the mouth end of the cigarette is 10 mm in length, and composed of cellulose acetate tow impregnated with 7% by weight of triacetin plasticiser. The second filter element 3b, positioned adjacent the first filter element 3a is a cavity 7 mm in length containing 100 mg of an activated porous carbon material according to the invention. The third filter element 3c adjacent the second filter element 3b is 10 mm in length and comprises cellulose acetate tow impregnated with 7% by weight of triacetin. A ring of ventilation holes 5 is formed in the tipping paper 4 in a radial plane A-A which deliver air into the second filter element 3b about 3 mm downstream of the junction with the third filter element 3c when smoke is inhaled through the cigarette.

In summary, the Examples provide a porous carbon material suitable for incorporation in smoke filters for cigarettes that has a BET surface area of at least 800 m$^2$/g and a pore structure that includes mesopores and micropores. The pore volume (as measured by nitrogen adsorption) is at least 0.9 cm$^3$/g and from 15 to 65% of the pore volume is in mesopores. The pore structure of the material provides a bulk density generally less than 0.5 g/cc. The material may be produced by carbonising and activating organic resins and may be in the form of beads for ease of handling.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

The invention claimed is:

1. A smoking article comprising smoking material and a porous carbon material, wherein the porous carbon material has:
   a BET surface area of about 900 to about 1638 m$^2$/g,
   a pore structure that includes mesopores and micropores,
   a pore volume (as measured by nitrogen adsorption) of at least 0.9 cm$^3$/g,
   a bulk density of not more than 0.5 g/cc,
   15 to 65% of the pore volume of the porous carbon material (as measured by nitrogen adsorption) is in mesopores, and
   the porous carbon material is in particulate form having a mean particle size of 50 to 1000 micron.

2. A smoking article according to claim 1 comprising a rod of smoking material and a filter, and the porous carbon material is incorporated in the filter.

3. A smoking article according to claim 1, wherein the pore volume (as measured by nitrogen adsorption) of the porous carbon material is at least 1.0 cm$^3$/g and from 30 to 65% of the pore volume is in mesopores.

4. A smoking article according to claim 1, wherein less than 20% of the pore volume of the porous carbon material is in pores having diameters in the range 2-10 nm.

5. A smoking article according to claim 1, wherein the porous carbon material has a BET surface area of 900 to 1300 m$^2$/g.

6. A smoking article according to claim 5, wherein the porous carbon material has a BET surface area of from 1000 to 1250 m$^2$/g.

7. A smoking article according to claim 1, wherein the pore volume of the porous carbon material in micropores and mesopores is from 1.1 to 2 cm$^3$/g.

8. A smoking article according to claim 1, wherein from 35 to 55% of the pore volume of the porous carbon material is in mesopores.

9. A smoking article according to claim 1, wherein the porous carbon material is in the form of microbeads.

10. A smoking article according to claim 1, wherein the porous carbon material has a mean particle size of 50 to 700 microns.

11. A smoking article according to claim 10, wherein the porous carbon material has a mean particle size of 150 to 500 microns.

12. A smoking article according to claim 1, wherein the porous carbon material has a D90/D10 particle size distribution of at least 10.

13. A smoking article according to claim 1, wherein the porous carbon material is substantially free of particles smaller than 10 microns.

14. A smoking article according to claim 1, wherein the porous carbon material is composed of a carbonised organic resin.

15. A smoking article according to claim 14, wherein the organic resin contains nitrogen.

16. A smoking article according to claim 15, wherein the resin is produced by condensing a nucleophilic component with an electrophilic cross linking agent in the presence of a pore former.

17. A smoking article according to claim 15, wherein the nucleophilic component or the cross-linking agent is an organic nitrogen compound.

18. A smoking article according to claim 15, wherein the nucleophilic component comprises a novolak resin.

19. A smoking article according to claim 15, wherein the crosslinking agent comprises hexamethylene tetramine.

20. A smoking article according to claim 15, wherein the pore former comprises ethylene glycol.

21. A smoking article filter comprising a porous carbon material having:
   a BET surface area of about 900 to about 1638 m$^2$/g,
   a pore structure that includes mesopores and micropores,
   a pore volume (as measured by nitrogen adsorption) of at least 0.9 cm$^3$/g,
   a bulk density of not more than 0.5 g/cc, 15 to 65% of the pore volume of the porous carbon material (as measured by nitrogen adsorption) is in mesopores, and the porous carbon material is in particulate form having a mean particle size of 50 to 1000 microns.

22. A smoking article filter according to claim 21, wherein the pore volume (as measured by nitrogen adsorption) of the porous carbon material is at least 1.0 cm$^3$/g and from 30 to 65% of the pore volume is in mesopores.

23. A smoking article filter according to claim 21, wherein less than 20% of the pore volume of the porous carbon material is in pores having diameters in the range 2-10 nm.

24. A smoking article filter according to claim 21, wherein the porous carbon material has a BET surface area of 900 to 1300 m$^2$/g.

25. A smoking article filter according to claim 24, wherein the porous carbon material has a BET surface area of from 1000 to 1250 m$^2$/g.

26. A smoking article filter according to claim 21, wherein the pore volume of the porous carbon material in micropores and mesopores is from 1.1 to 2 cm$^3$/g.

27. A smoking article filter according to claim 21, wherein from 35 to 55% of the pore volume of the porous carbon material is in mesopores.

28. A smoking article filter according to claim 21, wherein the porous carbon material is in the form of microbeads.

29. A smoking article filter according to claim 21, wherein the porous carbon material has a mean particle size of 50 to 700 microns.

30. A smoking article filter according to claim 29, wherein the porous carbon material has a mean particle size of 150 to 500 microns.

31. A smoking article filter according to claim 21, wherein the porous carbon material has a D90/D10 particle size distribution of at least 10.

32. A smoking article filter according to claim 21, wherein the porous carbon material is substantially free of particles smaller than 10 microns.

33. A smoking article filter according to claim 21, wherein the porous carbon material is composed of a carbonised organic resin.

34. A smoking article filter according to claim 33, wherein the organic resin contains nitrogen.

35. A smoking article filter according to claim 33, wherein the resin is produced by condensing a nucleophilic component with an electrophilic cross linking agent in the presence of a pore former.

36. A smoking article filter according to claim 33, wherein the nucleophilic component or the cross-linking agent is an organic nitrogen compound.

37. A smoking article filter according to claim 33, wherein the nucleophilic component comprises a novolak resin.

38. A smoking article filter according to claim 33, wherein the crosslinking agent comprises hexamethylene tetramine.

39. A smoking article filter according to claim 33, wherein the pore former comprises ethylene glycol.

* * * * *